(12) United States Patent
Brody et al.

(10) Patent No.: US 10,512,893 B2
(45) Date of Patent: Dec. 24, 2019

(54) STRUCTURED ADSORBENT BEDS, METHODS OF PRODUCING THE SAME AND USES THEREOF

(71) Applicants: John F. Brody, Bound Brook, NJ (US); Daniel P. Leta, Flemington, NJ (US); Tracy Alan Fowler, Magnolia, TX (US); Stephanie A. Freeman, Houston, TX (US); Joshua I. Cutler, Somerville, NJ (US)

(72) Inventors: John F. Brody, Bound Brook, NJ (US); Daniel P. Leta, Flemington, NJ (US); Tracy Alan Fowler, Magnolia, TX (US); Stephanie A. Freeman, Houston, TX (US); Joshua I. Cutler, Somerville, NJ (US)

(73) Assignee: ExxonMobil Upstream Research Company, Spring, TX (US)

( * ) Notice: Subject to any disclaimer, the term of this patent is extended or adjusted under 35 U.S.C. 154(b) by 36 days.

(21) Appl. No.: 15/661,562

(22) Filed: Jul. 27, 2017

(65) Prior Publication Data
US 2018/0001301 A1 Jan. 4, 2018

Related U.S. Application Data

(63) Continuation of application No. 14/953,648, filed on Nov. 30, 2015, now Pat. No. 9,744,521.
(Continued)

(51) Int. Cl.
*B01D 53/04* (2006.01)
*B01J 20/18* (2006.01)
(Continued)

(52) U.S. Cl.
CPC ........ *B01J 20/28045* (2013.01); *B01D 53/02* (2013.01); *B01J 20/0211* (2013.01);
(Continued)

(58) Field of Classification Search
CPC .. B01D 53/02; B01D 53/047; B01D 53/0462; B01D 2253/108; B01D 2253/25;
(Continued)

(56) References Cited

U.S. PATENT DOCUMENTS

| 1,868,138 A | 7/1932 | Fisk |
| 3,103,425 A | 9/1963 | Meyer |

(Continued)

FOREIGN PATENT DOCUMENTS

| CA | 2297590 | 9/2000 |
| CA | 2237103 | 12/2001 |

(Continued)

OTHER PUBLICATIONS

ExxonMobil Research and Engineering and QuestAir (2008) "A New Commercialized Process for Lower Cost H2 Recovery—Rapid Cycle Pressure Swing Adsorption (RCPSA)," *Brochure*, 4 pgs.
(Continued)

*Primary Examiner* — Frank M Lawrence, Jr.
(74) *Attorney, Agent, or Firm* — ExxonMobil Upstream Research Company—Law Department

(57) ABSTRACT

Structured adsorbent beds comprising a high cell density substrate, such as greater than about 1040 cpsi, and a coating comprising adsorbent particles, such as DDR and a binder, such as $SiO_2$ are provided herein. Methods of preparing the structured adsorbent bed and gas separation processes using the structured adsorbent bed are also provided herein.

29 Claims, 16 Drawing Sheets

Related U.S. Application Data

(60) Provisional application No. 62/119,458, filed on Feb. 23, 2015, provisional application No. 62/096,137, filed on Dec. 23, 2014.

(51) Int. Cl.

| | | |
|---|---|---|
| *B01J 20/28* | (2006.01) | |
| *B01J 20/32* | (2006.01) | |
| *B01J 20/30* | (2006.01) | |
| *B01J 20/06* | (2006.01) | |
| *B01J 20/10* | (2006.01) | |
| *B01D 53/02* | (2006.01) | |
| *B01J 20/02* | (2006.01) | |
| *C10L 3/10* | (2006.01) | |
| *B01D 53/047* | (2006.01) | |

(52) U.S. Cl.
CPC .............. *B01J 20/06* (2013.01); *B01J 20/10* (2013.01); *B01J 20/183* (2013.01); *B01J 20/2803* (2013.01); *B01J 20/28004* (2013.01); *B01J 20/28011* (2013.01); *B01J 20/28042* (2013.01); *B01J 20/3042* (2013.01); *B01J 20/3078* (2013.01); *B01J 20/3204* (2013.01); *B01J 20/3223* (2013.01); *B01J 20/3236* (2013.01); *B01J 20/3238* (2013.01); *B01J 20/3289* (2013.01); *C10L 3/101* (2013.01); *B01D 53/047* (2013.01); *B01D 53/0462* (2013.01); *B01D 2253/108* (2013.01); *B01D 2253/25* (2013.01); *B01D 2253/342* (2013.01); *B01D 2256/245* (2013.01); *B01D 2257/102* (2013.01); *B01D 2257/302* (2013.01); *B01D 2257/304* (2013.01); *B01D 2257/306* (2013.01); *B01D 2257/404* (2013.01); *B01D 2257/504* (2013.01); *B01D 2257/702* (2013.01); *B01D 2257/80* (2013.01); *Y02C 10/08* (2013.01)

(58) Field of Classification Search
CPC ........ B01D 2253/342; B01D 2256/245; B01D 2257/302; B01D 2257/304; B01D 2257/306; B01D 2257/404; B01D 2257/504; B01D 2257/702; B01D 2257/80; B01J 20/0211; B01J 20/06; B01J 20/10; B01J 20/183; B01J 20/28004; B01J 20/28011; B01J 20/2803; B01J 20/28042; B01J 20/28045; B01J 20/3042; B01J 20/3078; B01J 20/3204; B01J 20/3223; B01J 20/3236; B01J 20/3238; B01J 20/3289; C10L 3/101; Y02C 10/08
USPC ............. 95/90, 96, 117, 139, 136, 129, 137, 95/900–903; 96/108, 154
See application file for complete search history.

(56) References Cited

U.S. PATENT DOCUMENTS

| | | |
|---|---|---|
| 3,124,152 A | 3/1964 | Payne |
| 3,142,547 A | 7/1964 | Marsh et al. |
| 3,508,758 A | 4/1970 | Strub |
| 3,602,247 A | 8/1971 | Bunn et al. |
| 3,788,036 A | 1/1974 | Lee et al. |
| 3,967,464 A | 7/1976 | Cormier et al. |
| 4,187,092 A | 2/1980 | Woolley |
| 4,261,815 A | 4/1981 | Kelland |
| 4,324,565 A | 4/1982 | Benkmann |
| 4,325,565 A | 4/1982 | Winchell |
| 4,329,162 A | 5/1982 | Pitcher |
| 4,340,398 A | 7/1982 | Doshi et al. |
| 4,386,947 A | 6/1983 | Mizuno et al. |
| 4,445,441 A | 5/1984 | Tanca |
| 4,461,630 A | 7/1984 | Cassidy et al. |
| 4,496,376 A | 1/1985 | Hradek |
| 4,705,627 A | 11/1987 | Miwa et al. |
| 4,711,968 A | 12/1987 | Oswald et al. |
| 4,737,170 A | 4/1988 | Searle |
| 4,770,676 A | 9/1988 | Sircar et al. |
| 4,783,205 A | 11/1988 | Searle |
| 4,784,672 A | 11/1988 | Sircar |
| 4,790,272 A | 12/1988 | Woolenweber |
| 4,814,146 A | 3/1989 | Brand et al. |
| 4,816,039 A | 3/1989 | Krishnamurthy et al. |
| 4,877,429 A | 10/1989 | Hunter |
| 4,977,745 A | 12/1990 | Heichberger |
| 5,110,328 A | 5/1992 | Yokota et al. |
| 5,125,934 A | 6/1992 | Krishnamurthy et al. |
| 5,169,006 A | 12/1992 | Stelzer |
| 5,174,796 A | 12/1992 | Davis et al. |
| 5,224,350 A | 7/1993 | Mehra |
| 5,234,472 A | 8/1993 | Krishnamurthy et al. |
| 5,292,990 A | 3/1994 | Kantner et al. |
| 5,306,331 A | 4/1994 | Auvil et al. |
| 5,354,346 A | 10/1994 | Kumar |
| 5,365,011 A | 11/1994 | Ramachandran et al. |
| 5,370,728 A | 12/1994 | LaSala et al. |
| 5,486,227 A | 1/1996 | Kumar et al. |
| 5,547,641 A | 8/1996 | Smith et al. |
| 5,565,018 A | 10/1996 | Baksh et al. |
| 5,672,196 A | 9/1997 | Acharya et al. |
| 5,700,310 A | 12/1997 | Bowman et al. |
| 5,733,451 A | 3/1998 | Coellner et al. |
| 5,735,938 A | 4/1998 | Baksh et al. |
| 5,750,026 A | 5/1998 | Gadkaree et al. |
| 5,769,928 A | 6/1998 | Leavitt |
| 5,792,239 A | 8/1998 | Reinhold, III et al. |
| 5,807,423 A | 9/1998 | Lemcoff et al. |
| 5,811,616 A | 9/1998 | Holub et al. |
| 5,827,358 A | 10/1998 | Kulish et al. |
| 5,906,673 A | 5/1999 | Reinhold, III et al. |
| 5,912,426 A | 6/1999 | Smolarek et al. |
| 5,924,307 A | 7/1999 | Nenov |
| 5,935,444 A | 8/1999 | Johnson et al. |
| 5,968,234 A | 10/1999 | Midgett, II et al. |
| 5,976,221 A | 11/1999 | Bowman et al. |
| 5,997,617 A | 12/1999 | Czabala et al. |
| 6,007,606 A | 12/1999 | Baksh et al. |
| 6,011,192 A | 1/2000 | Baker et al. |
| 6,023,942 A | 2/2000 | Thomas et al. |
| 6,053,966 A | 4/2000 | Moreau et al. |
| 6,063,161 A | 5/2000 | Keefer et al. |
| 6,096,115 A | 8/2000 | Kleinberg |
| 6,099,621 A | 8/2000 | Ho |
| 6,129,780 A | 10/2000 | Millet et al. |
| 6,136,222 A | 10/2000 | Friesen et al. |
| 6,147,126 A | 11/2000 | DeGeorge et al. |
| 6,152,991 A | 11/2000 | Ackley |
| 6,156,101 A | 12/2000 | Naheiri |
| 6,171,371 B1 | 1/2001 | Derive et al. |
| 6,176,897 B1 | 1/2001 | Keefer |
| 6,179,900 B1 | 1/2001 | Behling et al. |
| 6,183,538 B1 | 2/2001 | Naheiri |
| 6,194,079 B1 | 2/2001 | Hekal |
| 6,210,466 B1 | 4/2001 | Whysall et al. |
| 6,231,302 B1 | 5/2001 | Bonardi |
| 6,245,127 B1 | 6/2001 | Kane et al. |
| 6,284,021 B1 | 9/2001 | Lu et al. |
| 6,311,719 B1 | 11/2001 | Hill et al. |
| 6,345,954 B1 | 2/2002 | Al-Himyary et al. |
| 6,398,853 B1 | 6/2002 | Keefer et al. |
| 6,402,813 B2 | 6/2002 | Monereau et al. |
| 6,406,523 B1 | 6/2002 | Connor et al. |
| 6,425,938 B1 | 7/2002 | Xu et al. |
| 6,432,379 B1 | 8/2002 | Heung |
| 6,436,171 B1 | 8/2002 | Wang et al. |
| 6,444,012 B1 | 9/2002 | Dolan et al. |
| 6,444,014 B1 | 9/2002 | Mullhaupt et al. |
| 6,444,523 B1 | 9/2002 | Fan et al. |

(56) References Cited

U.S. PATENT DOCUMENTS

| | | |
|---|---|---|
| 6,444,610 B1 | 9/2002 | Yamamoto |
| 6,451,095 B1 | 9/2002 | Keefer et al. |
| 6,457,485 B2 | 10/2002 | Hill et al. |
| 6,471,939 B1 | 10/2002 | Boix et al. |
| 6,488,747 B1 | 12/2002 | Keefer et al. |
| 6,497,750 B2 | 12/2002 | Butwell et al. |
| 6,500,234 B1 | 12/2002 | Ackley et al. |
| 6,500,241 B2 | 12/2002 | Reddy |
| 6,500,404 B1 | 12/2002 | Camblor Fernandez et al. |
| 6,503,299 B2 | 1/2003 | Baksh et al. |
| 6,506,351 B1 | 1/2003 | Jain et al. |
| 6,514,318 B2 | 2/2003 | Keefer |
| 6,514,319 B2 | 2/2003 | Keefer et al. |
| 6,517,609 B1 | 2/2003 | Monereau et al. |
| 6,531,516 B2 | 3/2003 | Davis et al. |
| 6,533,846 B1 | 3/2003 | Keefer et al. |
| 6,565,627 B1 | 5/2003 | Golden et al. |
| 6,565,635 B2 | 5/2003 | Keefer et al. |
| 6,565,825 B2 | 5/2003 | Ohji et al. |
| 6,572,678 B1 | 6/2003 | Wijmans et al. |
| 6,579,341 B2 | 6/2003 | Baker et al. |
| 6,593,541 B1 | 7/2003 | Herren |
| 6,595,233 B2 | 7/2003 | Pulli |
| 6,605,136 B1 | 8/2003 | Graham et al. |
| 6,607,584 B2 | 8/2003 | Moreau et al. |
| 6,630,012 B2 | 10/2003 | Wegeng et al. |
| 6,631,626 B1 | 10/2003 | Hahn |
| 6,641,645 B1 | 11/2003 | Lee et al. |
| 6,651,645 B1 | 11/2003 | Nunez Suarez |
| 6,660,064 B2 | 12/2003 | Golden et al. |
| 6,660,065 B2 | 12/2003 | Byrd et al. |
| 6,692,626 B2 | 2/2004 | Keefer et al. |
| 6,712,087 B2 | 3/2004 | Hill et al. |
| 6,742,507 B2 | 6/2004 | Keefer et al. |
| 6,746,515 B2 | 6/2004 | Wegeng et al. |
| 6,752,852 B1 | 6/2004 | Jacksier et al. |
| 6,770,120 B2 | 8/2004 | Neu et al. |
| 6,773,225 B2 | 8/2004 | Yuri et al. |
| 6,802,889 B2 | 10/2004 | Graham et al. |
| 6,814,771 B2 | 11/2004 | Scardino et al. |
| 6,835,354 B2 | 12/2004 | Woods et al. |
| 6,840,985 B2 | 1/2005 | Keefer |
| 6,866,950 B2 | 3/2005 | Connor et al. |
| 6,889,710 B2 | 5/2005 | Wagner |
| 6,890,376 B2 | 5/2005 | Arquin et al. |
| 6,893,483 B2 | 5/2005 | Golden et al. |
| 6,902,602 B2 | 6/2005 | Keefer et al. |
| 6,916,358 B2 | 7/2005 | Nakamura et al. |
| 6,918,953 B2 | 7/2005 | Lomax, Jr. et al. |
| 6,921,597 B2 | 7/2005 | Keefer et al. |
| 6,936,561 B2 | 8/2005 | Marques et al. |
| 6,974,496 B2 | 12/2005 | Wegeng et al. |
| 7,025,801 B2 | 4/2006 | Monereau |
| 7,027,929 B2 | 4/2006 | Wang |
| 7,029,521 B2 | 4/2006 | Johansson |
| 7,074,323 B2 | 7/2006 | Ghijsen |
| 7,077,891 B2 | 7/2006 | Jaffe et al. |
| 7,087,331 B2 | 8/2006 | Keefer et al. |
| 7,094,275 B2 | 8/2006 | Keefer et al. |
| 7,097,925 B2 | 8/2006 | Keefer et al. |
| 7,112,239 B2 | 9/2006 | Kimbara et al. |
| 7,117,669 B2 | 10/2006 | Kaboord et al. |
| 7,122,073 B1 | 10/2006 | Notaro et al. |
| 7,128,775 B2 | 10/2006 | Celik et al. |
| 7,144,016 B2 | 12/2006 | Gozdawa |
| 7,160,356 B2 | 1/2007 | Koros et al. |
| 7,160,367 B2 | 1/2007 | Babicki et al. |
| 7,166,149 B2 | 1/2007 | Dunne et al. |
| 7,172,645 B1 | 2/2007 | Pfister et al. |
| 7,189,280 B2 | 3/2007 | Alizadeh-Khiavi et al. |
| 7,250,073 B2 | 7/2007 | Keefer et al. |
| 7,250,074 B2 | 7/2007 | Tonkovich et al. |
| 7,255,727 B2 | 8/2007 | Monereau et al. |
| 7,258,725 B2 | 8/2007 | Ohmi et al. |
| 7,276,107 B2 | 10/2007 | Baksh et al. |
| 7,279,029 B2 | 10/2007 | Occhialini et al. |
| 7,285,350 B2 | 10/2007 | Keefer et al. |
| 7,297,279 B2 | 11/2007 | Johnson et al. |
| 7,311,763 B2 | 12/2007 | Neary |
| RE40,006 E | 1/2008 | Keefer et al. |
| 7,314,503 B2 | 1/2008 | Landrum et al. |
| 7,354,562 B2 | 4/2008 | Ying et al. |
| 7,387,849 B2 | 6/2008 | Keefer et al. |
| 7,390,350 B2 | 6/2008 | Weist, Jr. et al. |
| 7,404,846 B2 | 7/2008 | Golden et al. |
| 7,438,079 B2 | 10/2008 | Cohen et al. |
| 7,449,049 B2 | 11/2008 | Thomas et al. |
| 7,456,131 B2 | 11/2008 | Klett et al. |
| 7,510,601 B2 | 3/2009 | Whitley et al. |
| 7,527,670 B2 | 5/2009 | Ackley et al. |
| 7,553,568 B2 | 6/2009 | Keefer |
| 7,560,154 B2 | 7/2009 | Katoh |
| 7,578,864 B2 | 8/2009 | Watanabe et al. |
| 7,604,682 B2 | 10/2009 | Seaton |
| 7,637,989 B2 | 12/2009 | Bong |
| 7,641,716 B2 | 1/2010 | Lomax, Jr. et al. |
| 7,645,324 B2 | 1/2010 | Rode et al. |
| 7,651,549 B2 | 1/2010 | Whitley |
| 7,674,319 B2 | 3/2010 | Lomax, Jr. et al. |
| 7,674,539 B2 | 3/2010 | Keefer et al. |
| 7,687,044 B2 | 3/2010 | Keefer et al. |
| 7,713,333 B2 | 5/2010 | Rege et al. |
| 7,717,981 B2 | 5/2010 | LaBuda et al. |
| 7,722,700 B2 | 5/2010 | Sprinkle |
| 7,731,782 B2 | 6/2010 | Kelley et al. |
| 7,740,687 B2 | 6/2010 | Reinhold, III |
| 7,744,676 B2 | 6/2010 | Leitmayr et al. |
| 7,744,677 B2 | 6/2010 | Barclay et al. |
| 7,758,051 B2 | 7/2010 | Roberts-Haritonov et al. |
| 7,758,988 B2 | 7/2010 | Keefer et al. |
| 7,763,098 B2 | 7/2010 | Alizadeh-Khiavi et al. |
| 7,763,099 B2 | 7/2010 | Verma et al. |
| 7,792,983 B2 | 9/2010 | Mishra et al. |
| 7,793,675 B2 | 9/2010 | Cohen et al. |
| 7,806,965 B2 | 10/2010 | Stinson |
| 7,819,948 B2 | 10/2010 | Wagner |
| 7,828,877 B2 | 11/2010 | Sawada et al. |
| 7,828,880 B2 | 11/2010 | Moriya et al. |
| 7,854,793 B2 | 12/2010 | Rarig et al. |
| 7,858,169 B2 | 12/2010 | Yamashita |
| 7,862,645 B2 | 1/2011 | Whitley et al. |
| 7,867,320 B2 | 1/2011 | Baksh et al. |
| 7,902,114 B2 | 3/2011 | Bowie et al. |
| 7,938,886 B2 | 5/2011 | Hershkowitz et al. |
| 7,947,118 B2 | 5/2011 | Rarig et al. |
| 7,947,120 B2 | 5/2011 | Deckman et al. |
| 7,959,720 B2 | 6/2011 | Deckman et al. |
| 8,016,918 B2 | 9/2011 | LaBuda et al. |
| 8,034,164 B2 | 10/2011 | Lomax, Jr. et al. |
| 8,071,063 B2 | 12/2011 | Reyes et al. |
| 8,128,734 B2 | 3/2012 | Song |
| 8,142,745 B2 | 3/2012 | Reyes et al. |
| 8,142,746 B2 | 3/2012 | Reyes et al. |
| 8,192,709 B2 | 6/2012 | Reyes et al. |
| 8,210,772 B2 | 7/2012 | Gillecriosd |
| 8,227,121 B2 | 7/2012 | Adams et al. |
| 8,262,773 B2 | 9/2012 | Northrop et al. |
| 8,262,783 B2 | 9/2012 | Stoner et al. |
| 8,268,043 B2 | 9/2012 | Celik et al. |
| 8,268,044 B2 | 9/2012 | Wright et al. |
| 8,272,401 B2 | 9/2012 | McLean |
| 8,287,629 B2 | 10/2012 | Fujita et al. |
| 8,319,090 B2 | 11/2012 | Kitamura |
| 8,337,594 B2 | 12/2012 | Corma Canos et al. |
| 8,361,200 B2 | 1/2013 | Sayari et al. |
| 8,361,205 B2 | 1/2013 | Desai et al. |
| 8,377,173 B2 | 2/2013 | Chuang |
| 8,444,750 B2 | 5/2013 | Deckman et al. |
| 8,470,395 B2 | 6/2013 | Khiavi et al. |
| 8,480,795 B2 | 7/2013 | Siskin et al. |
| 8,512,569 B2 | 8/2013 | Eaton et al. |
| 8,518,356 B2 | 8/2013 | Schaffer et al. |
| 8,529,662 B2 | 9/2013 | Kelley et al. |
| 8,529,663 B2 | 9/2013 | Reyes et al. |

(56) References Cited

U.S. PATENT DOCUMENTS

| | | |
|---|---|---|
| 8,529,664 B2 | 9/2013 | Deckman et al. |
| 8,529,665 B2 | 9/2013 | Manning et al. |
| 8,535,414 B2 | 9/2013 | Johnson et al. |
| 8,545,602 B2 | 10/2013 | Chance et al. |
| 8,551,444 B2 | 10/2013 | Agnihotri et al. |
| 8,573,124 B2 | 11/2013 | Havran et al. |
| 8,591,627 B2 | 11/2013 | Jain |
| 8,591,634 B2 | 11/2013 | Winchester et al. |
| 8,616,233 B2 | 12/2013 | McLean et al. |
| 8,657,922 B2 | 2/2014 | Yamawaki et al. |
| 8,673,059 B2 | 3/2014 | Leta et al. |
| 8,680,344 B2 | 3/2014 | Weston et al. |
| 8,715,617 B2 | 5/2014 | Genkin et al. |
| 8,752,390 B2 | 6/2014 | Wright et al. |
| 8,778,051 B2 | 7/2014 | Weist, Jr. et al. |
| 8,784,533 B2 | 7/2014 | Leta et al. |
| 8,784,534 B2 | 7/2014 | Kamakoti et al. |
| 8,784,535 B2 | 7/2014 | Ravikovitch et al. |
| 8,795,411 B2 | 8/2014 | Hufton et al. |
| 8,808,425 B2 | 8/2014 | Genkin et al. |
| 8,808,426 B2 | 8/2014 | Sundaram |
| 8,814,985 B2 | 8/2014 | Gerds et al. |
| 8,852,322 B2 | 10/2014 | Gupta et al. |
| 8,858,683 B2 | 10/2014 | Deckman |
| 8,875,483 B2 | 11/2014 | Wettstein |
| 8,906,138 B2 | 12/2014 | Rasmussen et al. |
| 8,921,637 B2 | 12/2014 | Sundaram et al. |
| 8,939,014 B2 | 1/2015 | Kamakoti et al. |
| 9,005,561 B2 | 4/2015 | Leta et al. |
| 9,017,457 B2 | 4/2015 | Tammera |
| 9,028,595 B2 | 5/2015 | Sundaram et al. |
| 9,034,078 B2 | 5/2015 | Wanni et al. |
| 9,034,079 B2 | 5/2015 | Deckman et al. |
| 9,050,553 B2 | 6/2015 | Alizadeh-Khiavi et al. |
| 9,067,168 B2 | 6/2015 | Frederick et al. |
| 9,095,809 B2 | 8/2015 | Deckman et al. |
| 9,108,145 B2 | 8/2015 | Kalbassi et al. |
| 9,120,049 B2 | 9/2015 | Sundaram et al. |
| 9,126,138 B2 | 9/2015 | Deckman et al. |
| 9,162,175 B2 | 10/2015 | Sundaram |
| 9,168,485 B2 | 10/2015 | Deckman et al. |
| 9,744,521 B2 * | 8/2017 | Brody ............... B01J 20/28045 |
| 2001/0047824 A1 | 12/2001 | Hill et al. |
| 2002/0124885 A1 | 9/2002 | Hill et al. |
| 2002/0162452 A1 | 11/2002 | Butwell et al. |
| 2003/0075485 A1 | 4/2003 | Ghijsen |
| 2003/0129101 A1 | 7/2003 | Zettel |
| 2003/0131728 A1 | 7/2003 | Kanazirev et al. |
| 2003/0170527 A1 | 9/2003 | Finn et al. |
| 2003/0202918 A1 | 10/2003 | Ashida et al. |
| 2003/0205130 A1 | 11/2003 | Neu et al. |
| 2003/0223856 A1 | 12/2003 | Yuri et al. |
| 2004/0099142 A1 | 5/2004 | Arquin et al. |
| 2004/0118747 A1 | 6/2004 | Cutler et al. |
| 2004/0197596 A1 | 10/2004 | Connor et al. |
| 2004/0232622 A1 | 11/2004 | Gozdawa |
| 2005/0109419 A1 | 5/2005 | Ohmi et al. |
| 2005/0114032 A1 | 5/2005 | Wang |
| 2005/0129952 A1 | 6/2005 | Sawada et al. |
| 2005/0014511 A1 | 7/2005 | Keefer et al. |
| 2005/0145111 A1 | 7/2005 | Keefer et al. |
| 2005/0150378 A1 | 7/2005 | Dunne et al. |
| 2005/0229782 A1 | 10/2005 | Monereau et al. |
| 2005/0252378 A1 | 11/2005 | Celik et al. |
| 2006/0048648 A1 | 3/2006 | Gibbs et al. |
| 2006/0049102 A1 | 3/2006 | Miller et al. |
| 2006/0076270 A1 | 4/2006 | Poshusta et al. |
| 2006/0099096 A1 | 5/2006 | Shaffer et al. |
| 2006/0105158 A1 | 5/2006 | Fritz et al. |
| 2006/0162556 A1 | 7/2006 | Ackley et al. |
| 2006/0165574 A1 | 7/2006 | Sayari |
| 2006/0169142 A1 | 8/2006 | Rode et al. |
| 2006/0236862 A1 | 10/2006 | Golden et al. |
| 2007/0084241 A1 | 4/2007 | Kretchmer et al. |
| 2007/0084344 A1 | 4/2007 | Moriya et al. |
| 2007/0222160 A1 | 9/2007 | Roberts-Haritonov et al. |
| 2007/0253872 A1 | 11/2007 | Keefer et al. |
| 2007/0261550 A1 | 11/2007 | Ota |
| 2007/0261557 A1 | 11/2007 | Gadkaree et al. |
| 2007/0283807 A1 | 12/2007 | Whitley |
| 2008/0051279 A1 | 2/2008 | Klett et al. |
| 2008/0072822 A1 | 3/2008 | White |
| 2008/0128655 A1 | 6/2008 | Garg et al. |
| 2008/0236389 A1 | 10/2008 | Leedy et al. |
| 2008/0282883 A1 | 11/2008 | Rarig et al. |
| 2008/0282884 A1 | 11/2008 | Kelley et al. |
| 2008/0282885 A1 | 11/2008 | Deckman et al. |
| 2008/0282886 A1 | 11/2008 | Reyes et al. |
| 2008/0282887 A1 | 11/2008 | Chance |
| 2008/0282892 A1 | 11/2008 | Deckman et al. |
| 2008/0289497 A1 | 11/2008 | Barclay et al. |
| 2008/0307966 A1 | 12/2008 | Stinson |
| 2008/0314550 A1 | 12/2008 | Greco |
| 2009/0004073 A1 | 1/2009 | Gleize et al. |
| 2009/0014902 A1 | 1/2009 | Koivunen et al. |
| 2009/0025553 A1 | 1/2009 | Keefer et al. |
| 2009/0037550 A1 | 2/2009 | Mishra et al. |
| 2009/0071333 A1 | 3/2009 | LaBuda et al. |
| 2009/0079870 A1 | 3/2009 | Matsui |
| 2009/0107332 A1 | 4/2009 | Wagner |
| 2009/0151559 A1 | 6/2009 | Verma et al. |
| 2009/0162268 A1 | 6/2009 | Hufton et al. |
| 2009/0180423 A1 | 7/2009 | Kroener |
| 2009/0241771 A1 | 10/2009 | Manning et al. |
| 2009/0284013 A1 | 11/2009 | Anand et al. |
| 2009/0308248 A1 | 12/2009 | Siskin et al. |
| 2009/0314159 A1 | 12/2009 | Haggerty |
| 2010/0059701 A1 | 3/2010 | McLean |
| 2010/0077920 A1 | 4/2010 | Baksh et al. |
| 2010/0089241 A1 | 4/2010 | Stoner et al. |
| 2010/0186445 A1 | 7/2010 | Minta et al. |
| 2010/0212493 A1 | 8/2010 | Rasmussen et al. |
| 2010/0251887 A1 | 10/2010 | Jain |
| 2010/0252497 A1 | 10/2010 | Ellison et al. |
| 2010/0263534 A1 | 10/2010 | Chuang |
| 2010/0282593 A1 | 11/2010 | Speirs et al. |
| 2010/0288704 A1 | 11/2010 | Amsden et al. |
| 2011/0031103 A1 | 2/2011 | Deckman et al. |
| 2011/0067440 A1 | 3/2011 | Van Aken |
| 2011/0067770 A1 | 3/2011 | Pederson et al. |
| 2011/0146494 A1 | 6/2011 | Desai et al. |
| 2011/0217218 A1 | 9/2011 | Gupta et al. |
| 2011/0277620 A1 | 11/2011 | Havran et al. |
| 2011/0291051 A1 | 12/2011 | Hershkowitz et al. |
| 2011/0296871 A1 | 12/2011 | Van Soest-Vercammen et al. |
| 2011/0308524 A1 | 12/2011 | Brey et al. |
| 2012/0024152 A1 | 2/2012 | Yamawaki et al. |
| 2012/0031144 A1 | 2/2012 | Northrop et al. |
| 2012/0067216 A1 | 3/2012 | Corma-Canos et al. |
| 2012/0152115 A1 | 6/2012 | Gerds et al. |
| 2012/0222551 A1 | 9/2012 | Deckman |
| 2012/0222552 A1 | 9/2012 | Ravikovitch et al. |
| 2012/0222553 A1 | 9/2012 | Kamakoti et al. |
| 2012/0222554 A1 | 9/2012 | Leta et al. |
| 2012/0222555 A1 | 9/2012 | Gupta et al. |
| 2012/0255377 A1 | 10/2012 | Kamakoti et al. |
| 2012/0272823 A1 * | 11/2012 | Halder ............... B01D 53/0407 95/139 |
| 2012/0308456 A1 | 12/2012 | Leta et al. |
| 2012/0312163 A1 | 12/2012 | Leta et al. |
| 2013/0061755 A1 | 3/2013 | Frederick et al. |
| 2013/0068101 A1 * | 3/2013 | Knapp ............... B01J 20/3007 96/108 |
| 2013/0095996 A1 | 4/2013 | Buelow et al. |
| 2013/0225898 A1 | 8/2013 | Sundaram et al. |
| 2014/0013955 A1 | 1/2014 | Tammera et al. |
| 2014/0060326 A1 | 3/2014 | Sundaram |
| 2014/0157984 A1 * | 6/2014 | Deckman ............... B01D 53/04 95/49 |
| 2014/0157986 A1 | 6/2014 | Ravikovitch et al. |
| 2014/0208797 A1 | 7/2014 | Kelley et al. |
| 2014/0216254 A1 | 8/2014 | Tammera et al. |
| 2015/0013377 A1 | 1/2015 | Oelfke |
| 2015/0068397 A1 | 3/2015 | Boulet et al. |

(56) References Cited

U.S. PATENT DOCUMENTS

| | | |
|---|---|---|
| 2015/0196870 A1 | 7/2015 | Albright et al. |
| 2016/0096163 A1* | 4/2016 | House ............... B01J 20/18 95/141 |
| 2016/0114314 A1* | 4/2016 | Ali ................... B01J 29/78 585/640 |
| 2016/0129433 A1* | 5/2016 | Fowler ............... C04B 28/24 428/116 |

FOREIGN PATENT DOCUMENTS

| | | |
|---|---|---|
| EP | 0225736 | 6/1987 |
| EP | 0257493 | 2/1988 |
| EP | 0262934 | 4/1988 |
| EP | 0426937 | 5/1991 |
| EP | 0904827 | 3/1999 |
| EP | 1018359 | 7/2000 |
| EP | 1577561 | 9/2005 |
| EP | 1674555 | 6/2006 |
| EP | 1045728 | 11/2009 |
| EP | 2823872 | 1/2015 |
| FR | 2854819 | 5/2003 |
| FR | 2924951 | 6/2009 |
| JP | 58-114715 | 7/1983 |
| JP | 59-232174 | 12/1984 |
| JP | 60-189318 | 12/1985 |
| JP | 2002-253818 | 10/1990 |
| JP | 04-180978 | 6/1992 |
| JP | 2011-169640 | 6/1999 |
| JP | 2011-280921 | 10/1999 |
| JP | 2000-024445 | 8/2001 |
| JP | 2002-348651 | 12/2002 |
| JP | 2006-016470 | 1/2006 |
| JP | 2006-036849 | 2/2006 |
| JP | 2008-272534 | 11/2008 |
| RU | 2329094 | 12/2006 |
| WO | WO2002/024309 | 3/2002 |
| WO | WO2005/073728 | 9/2002 |
| WO | WO2005/090793 | 9/2005 |
| WO | WO2011/139894 | 11/2011 |

OTHER PUBLICATIONS

Farooq, S. et al. (1990) "Continuous Contercurrent Flow Model for a Bulk PSA Separation Process," *AIChE J.*, v36 (2) p. 310-314.

FlowServe (2005)"Exceeding Expectations, US Navy Cuts Maintenance Costs With Flowserve GX-200 Non-Contacting Seal Retrofits," *Face-to-Face*, v17.1.

GE Oil & Gas (2007) "Dry Gas Seal Retrofit," Florene, Italy, www.ge.com/oilandgas, 4 pgs.

Hopper, B. et al. (2008) "World's First 10,000 psi Sour Gas Injection Compressor," *Proceedings of the 37th Turbomachinery Symosium*, pp. 73-95.

Kikkinides, E. S. et al. (1995) "Natural Gas Desulfurization by Adsorption: Feasibility and Multiplicity of Cyclic Steady States," *Ind. Eng. Chem. Res.* V. 34, pp. 255-262.

Rameshni, Mahin "Strategies for Sour Gas Field Developments," *Worley Parsons-Brochure*, 20 pgs.

Reyes, S. C. et al. (1997) "Frequency Modulation Methods for Diffusion and Adsorption Measurements in Porous Solids," *J. Phys. Chem. B.* v101, pp. 614-622.

Ruthven, D. M. et al. (1996) "Performance of a Parallel Passage Adsorbent Contactor," *Gas. Sep. Purif.*, vol. 10, No. 1, pp. 63-73.

Stahley, J. S. (2003) "Design, Operation, and Maintenance Considerations for Improved Dry Gas Seal Realiability in Centrifugal Compressors," *Dresser-Rand, Tech. Paper 134*, 15 pages.

Suzuki, M. (1985) "Continuous-Countercurrent-Flow Approximation for Dynamic Steady State Profile of Pressure Swing Adsorption" *AIChE Symp. Ser.* v81 (242) pp. 67-73.

Agrafiotis, C. et al., "The effect of particle size on the adhesion properties of oxide washcoats on cordierite honeycombs," Journal of Materials Science Letters, 1999, vol. 18, pp. 1421-1424.

* cited by examiner

Min. Diameter: 15 nm
Max. Diameter: 43 nm
Number Paricles Measured: 235
Mean Diameter: 30 nm
Median Diameter: 31 nm

STRUCTURED ADSORBENT BEDS, METHODS OF PRODUCING THE SAME AND USES THEREOF

CROSS-REFERENCE TO RELATED APPLICATIONS

This application is a continuation of U.S. application Ser. No. 14/953,648 filed Nov. 30, 2015 entitled STRUCTURED ADSORBENT BEDS, METHODS OF PRODUCING THE SAME AND USES THEREOF, and claims priority to U.S. Provisional Application Ser. No. 62/119,458 filed Feb. 23, 2015 and to U.S. Provisional Application Ser. No. 62/096,137 filed Dec. 23, 2014, which are herein incorporated by reference in their entirety.

FIELD

The present invention relates to structured adsorbent beds for purification of gas feedstreams and methods of making such structured adsorbent beds. The structured adsorbent beds comprise a substrate with a high cell density and a coating on the substrate, wherein the coating comprises adsorbent particles and a binder.

BACKGROUND

Gas separation is important in many industries for removing undesirable contaminants from a gas stream and for achieving a desired gas composition. For example, natural gas from many gas fields can contain significant levels of $H_2O$, $SO_2$, $H_2S$, $CO_2$, $N_2$, mercaptans, and/or heavy hydrocarbons that have to be removed to various degrees before the gas can be transported to market. It is preferred that as much of the acid gases (e.g., $H_2S$ and $CO_2$) be removed from natural gas as possible to leave methane as the recovered component. Small increases in recovery of methane can result in significant improvements in process economics and also serve to prevent unwanted resource loss. It is desirable to recover more than 80 vol %, particularly more than 90 vol %, of the methane when detrimental impurities are removed.

Additionally, synthesis gas (syngas) typically requires removal and separation of various components before it can be used in fuel, chemical and power applications because all of these applications have a specification of the exact composition of the syngas required for the process. As produced, syngas can contain at least CO and $H_2$. Other molecular components in syngas can be $CH_4$, $CO_2$, $H_2S$, $H_2O$, $N_2$, and combinations thereof. Minority (or trace) components in the gas can include hydrocarbons, $NH_3$, $NO_x$, and the like, and combinations thereof. In almost all applications, most of the $H_2S$ should typically be removed from the syngas before it can be used, and, in many applications, it can be desirable to remove much of the $CO_2$.

Adsorptive gas separation techniques are common in various industries using solid sorbent materials such as activated charcoal or a porous solid oxide such as alumina, silica-alumina, silica, or a crystalline zeolite. Adsorptive separation may be achieved by equilibrium or kinetic mechanisms. A large majority of processes operate through the equilibrium adsorption of the gas mixture where the adsorptive selectivity is primarily based upon differential equilibrium uptake of one or more species based on parameters such as pore size of the adsorbent. Kinetically based separation involves differences in the diffusion rates of different components of the gas mixture and allows different species to be separated regardless of similar equilibrium adsorption parameters.

Kinetically based separation processes may be operated as pressure swing adsorption (PSA), temperature swing adsorption (TSA), partial pressure swing or displacement purge adsorption (PPSA) or as hybrid processes comprised of components of several of these processes. These swing adsorption processes can be conducted with rapid cycles, in which case they are referred to as rapid cycle thermal swing adsorption (RCTSA), rapid cycle pressure swing adsorption (RCPSA), and rapid cycle partial pressure swing or displacement purge adsorption (RCPPSA) technologies, with the term "swing adsorption" taken to include all of these processes and combinations of them.

Traditionally, adsorptive separation processes use packed beds of adsorbent particulates. However, the traditional packed beds are not likely to meet the very stringent requirements for natural gas cleanup. Alternatively, a structured adsorbent bed can be utilized to adsorb certain gas species. The structured adsorbent bed can be a monolith, either in the form of one single block or in the form of extrudates with multiple channels or cells, such as a honeycomb structured monolith. The use of adsorbent monoliths provides one approach to designing an adsorbent bed that has low pressure drop, good flow distribution, and low dispersion. Monoliths have very low flow tortuosity and can also be engineered for almost any user specified void volume to meet a specified pressure drop. Other monolith advantages include avoidance of bed fluidization or lifting. In addition to gas separation processes, these types of monoliths have historically been employed as catalyst supports in automobile catalytic converters, catalytic combustion, electrochemical reactors and biochemical reactors.

In order to prepare the monoliths for use in gas separation processes or as catalyst supports, the cells are washcoated with layers of catalytic or adsorbent coatings. The cell density of the monolith and the size of the particles in the coating have a significant effect on the ability to successfully coat the cells in the monolith to provide a structured adsorbent bed. It is known that coating difficulty increases as the cell density of the monolith increases (i.e., the channel size of the monolith decreases), as the size of the particles in the coating increases over 2 μm, as the number of coatings increase and as substrate porosity decreases toward zero porosity. For example, Agrafiotis, C. et al. report that the size of the suspended particles affects the adhesion of the washcoat on the substrate, namely particles with a diameter of less than 2 μm have increased adhesion to a monolith with a cell density of 400 cells per square inch (cpsi) than larger diameter particles. *J. Mater. Sci. Lett.*, 18:1421-1424 (1999). Thus, typically the monoliths used in practice have lower cell densities (e.g., 300-900 cpsi), the coatings contain small particles (e.g., diameter less than 2 μm) and/or the coating is applied in very thin layers (e.g., 1 μm to 10 μm). For example, while U.S. Pat. No. 6,936,561 reports a coating layer thickness above 300 μm on a ceramic honeycomb monolith, the monolith has a low cell density of about 45 cpsi. Similarly, U.S. Pat. No. 7,560,154 reports a method of manufacturing a honeycomb structure with a coating particle size of 15 to 75 μm, but the cell density of the structure is 260 cpsi.

However, kinetic separation processes, specifically rapid cycle kinetic separation processes require structured adsorbent beds with ultra high cell density (i.e., greater than 1000 cpsi) and thicker coating layers. Furthermore, larger particle sizes in the coating are desirable because further milling to reduce the particle size can be avoided, thereby avoiding potential fracturing of the particles which can result in diminished capacity and activity. Therefore, there is a need to provide structured adsorbent beds with ultra high cell density as well as thicker coating layers and larger particles sizes in the coating.

SUMMARY

It has been found that a structured adsorbent bed for purification of a gas feedstream comprising a substrate having a high cell density (e.g., greater than 1040 cpsi), and a coating on the substrate, wherein the coating comprises large adsorbent particles (e.g., an average diameter greater than 20 μm) and a binder, can be achieved by pretreating the substrate prior to applying the adsorbent particles and binder.

Thus, in one aspect, embodiments of the invention provide a structured adsorbent bed for purification of a gas feedstream comprising: a substrate having a cell density greater than 1040 cpsi; and a coating on the substrate, wherein the coating comprises adsorbent particles and a binder.

In still another aspect, embodiments of the invention provide a method of preparing the structured adsorbent bed described herein, the method comprising: pretreating the substrate; preparing an aqueous slurry comprising the adsorbent particles and the binder; and applying the aqueous slurry to the substrate to form the coating on the substrate.

In still another aspect, embodiments of the invention provide a gas separation process comprising contacting a gas mixture containing at least one contaminant with an adsorbent bed described herein.

Other embodiments, including particular aspects of the embodiments summarized above, will be evident from the detailed description that follows.

DETAILED DESCRIPTION

Figure 1:
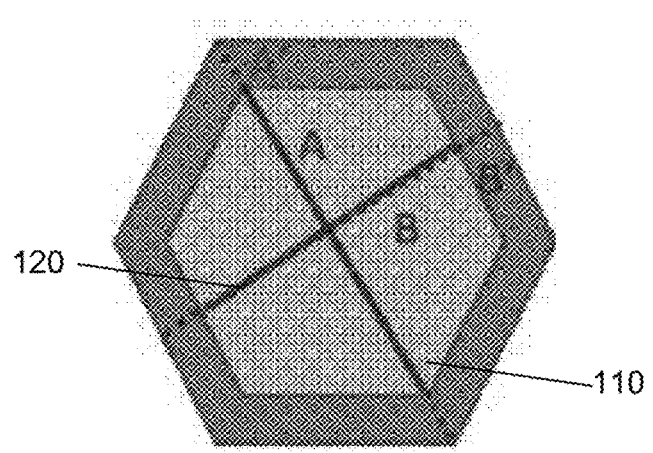
FIG. 1 illustrates an example of the distances used for determining the axis ratio of an adsorbent particle in a scanning electron microscope (SEM) image.

In various aspects of the invention, structured adsorbent beds, methods of preparing the structured adsorbent beds and gas separation processes using the structured adsorbent beds are provided.

I. Definitions

To facilitate an understanding of the present invention, a number of terms and phrases are defined below.

As used in the present disclosure and claims, the singular forms "a," "an," and "the" include plural forms unless the context clearly dictates otherwise.

Wherever embodiments are described herein with the language "comprising," otherwise analogous embodiments described in terms of "consisting of" and/or "consisting essentially of" are also provided.

The term "and/or" as used in a phrase such as "A and/or B" herein is intended to include "A and B", "A or B", "A", and "B".

As used herein, the term "adsorption" includes physisorption, chemisorption, and condensation onto a solid support and combinations thereof.

The term "monolith" refers to any three-dimensional material that can contain numerous parallel channels per square inch and can serve as a support for adsorbents or catalysts, such as solid pieces of metal or ceramic materials or honeycomb structures. The term monolith is meant to be distinguished from a collection of individual particles packed into a bed formation, in which the end product comprises individual particles.

As used herein, the term "average diameter" of the particle refers to the number average of the major axis and minor axis.

As used herein, the term "porosity" refers to a measure of the void spaces in a material, and is measured herein as percent between zero and 100%.

As used herein, the term "macroporosity" refers to the percentage of pores in a material that have a diameter greater than 50 nm.

As used herein, the term "microporous" refers to solid materials having pores with a diameter less than 2 nm.

As used herein, the term "Si/Al ratio" is defined as the molar ratio of silica to alumina of a zeolitic structure.

II. Structured Adsorbent Bed

In a first embodiment a structured adsorbent bed for purification of a gas feedstream is provided comprising a substrate and a coating on the substrate.

A. Substrate

As discussed above, substrates traditionally have a lower cell density because as cell density of the substrate increases and the channels in the bed decrease in size, difficulty in coating the substrates increases. However, substrates, such as monoliths, with higher cell density are provided herein. In various aspects, the substrate has a cell density of greater than or equal to about 900 cpsi, greater than or equal to about 920 cpsi, greater than or equal to about 940 cpsi, greater than or equal to about 960 cpsi, greater than or equal to about 980 cpsi, greater than or equal to about 1,000 cpsi, greater than or equal to about 1,020 cpsi, greater than or equal to about 1,040 cpsi, greater than or equal to about 1,060 cpsi, greater than or equal to about 1,080 cpsi, greater than or equal to about 1,100 cpsi, greater than or equal to about 1,120 cpsi, greater than or equal to about 1,140 cpsi, greater than or equal to about 1,160 cpsi, greater than or equal to about 1,180 cpsi, greater than or equal to about 1,200 cpsi, greater than or equal to about 1,220 cpsi, greater than or equal to about 1,240 cpsi, greater than or equal to about 1,260 cpsi, greater than or equal to about 1,280 cpsi, greater than or equal to about 1,300 cpsi, greater than or equal to about 1,320 cpsi, greater than or equal to about 1,340 cpsi, greater than or equal to about 1,360 cpsi, greater than or equal to about 1,380 cpsi, greater than or equal to about 1,400 cpsi, greater than or equal to about 1,420 cpsi, greater than or equal to about 1,440 cpsi, greater than or equal to about 1,460 cpsi, greater than or equal to about 1,480 cpsi, greater than or equal to about 1,500 cpsi, greater than or equal to about 1,520 cpsi, greater than or equal to about 1,640 cpsi, greater than or equal to about 1,760 cpsi, greater than or equal to about 1,880 cpsi, greater than or equal to about 1,900 cpsi, greater than or equal to about 1,920 cpsi, greater than or equal to about 1,940 cpsi, greater than or equal to about 1,960 cpsi, greater than or equal to about 1,980 cpsi, greater than or equal to about 2,000 cpsi, greater than or equal to about 2,100 cpsi, greater than or equal to about 2,200 cpsi, greater than or equal to about 2,300 cpsi, greater than or equal to about 2,400 cpsi, greater than or equal to about 2,500 cpsi, greater than or equal to about 2,600 cpsi, greater than or equal to about 2,700 cpsi, greater than or equal to about 2,800 cpsi, greater than or equal to about 2,900 cpsi, greater than or equal to about 3,000 cpsi, greater than or equal to about 3,100 cpsi, greater than or equal to about 3,200 cpsi, greater than or equal to about 3,300 cpsi, greater than or equal to about 3,400 cpsi, greater than or equal to about 3,500 cpsi, greater than or equal to about 3,600 cpsi, greater than or equal to about 3,700 cpsi, greater than or equal to about 3,800 cpsi, greater than or equal to about 3,900 cpsi, greater than or equal to about 4,000 cpsi, greater than or equal to about 4,100 cpsi, greater than or equal to about 4,200 cpsi, greater than or equal to about 4,300 cpsi, greater than or equal to about 4,400 cpsi, greater than or equal to about 4,500 cpsi, greater than or equal to about 4,600 cpsi, greater than or equal to about 4,700 cpsi, greater than or equal to about 4,800 cpsi, greater than or equal to about 4,900 cpsi, or greater than or equal to about 5,000 cpsi. Particularly, the substrate has a cell density greater than about 1,040 cpsi and greater than or equal to about 1,400 cpsi. Additionally or alternatively, the substrate has a cell density of less than or equal to about 900 cpsi, less than or equal to about 920 cpsi, less than or equal to about 940 cpsi, less than or equal to about 960 cpsi, less than or equal to about 980 cpsi, less than or equal to about 1,000 cpsi, less than or equal to about 1,020 cpsi, less than or equal to about 1,040 cpsi, less than or equal to about 1,060 cpsi, less than or equal to about 1,080 cpsi, less than or equal to about 1,100 cpsi, less than or equal to about 1,120 cpsi, less than or equal to about 1,140 cpsi, less than or equal to about 1,160 cpsi, less than or equal to about 1,180 cpsi, less than or equal to about 1,200 cpsi, less than or equal to about 1,220 cpsi, less than or equal to about 1,240 cpsi, less than or equal to about 1,260 cpsi, less than or equal to about 1,280 cpsi, less than or equal to about 1,300 cpsi, less than or equal to about 1,320 cpsi, less than or equal to about 1,340 cpsi, less than or equal to about 1,360 cpsi, less than or equal to about 1,380 cpsi, less than or equal to about 1,400 cpsi, less than or equal to about 1,420 cpsi, less than or equal to about 1,440 cpsi, less than or equal to about 1,460 cpsi, less than or equal to about 1,480 cpsi, less than or equal to about 1,500 cpsi, less than or equal to about 1,520 cpsi, less than or equal to about 1,640 cpsi, less than or equal to about 1,760 cpsi, less than or equal to about 1,880 cpsi, less than or equal to about 1,900 cpsi, less than or equal to about 1,920 cpsi, less than or equal to about 1,940 cpsi, less than or equal to about 1,960 cpsi, less than or equal to about 1,980 cpsi, less than or equal to about 2,000 cpsi, less than or equal to about 2,100 cpsi, less than or equal to about 2,200 cpsi, less than or equal to about 2,300 cpsi, less than or equal to about 2,400 cpsi, less than or equal to about 2,500 cpsi, less than or equal to about 2,600 cpsi, less than or equal to about 2,700 cpsi, less than or equal to about 2,800 cpsi, less than or equal to about 2,900 cpsi, less than or equal to about 3,000 cpsi, less than or equal to about 3,100 cpsi, less than or equal to about 3,200 cpsi, less than or equal to about 3,300 cpsi, less than or equal to about 3,400 cpsi, less than or equal to about 3,500 cpsi, less than or equal to about 3,600 cpsi, less than or equal to about 3,700 cpsi, less than or equal to about 3,800 cpsi, less than or equal to about 3,900 cpsi, less than or equal to about 4,000 cpsi, less than or equal to about 4,100 cpsi, less than or equal to about 4,200 cpsi, less than or equal to about 4,300 cpsi, less than or equal to about 4,400 cpsi, less than or equal to about 4,500 cpsi, less than or equal to about 4,600 cpsi, less than or equal to about 4,700 cpsi, less than or equal to about 4,800 cpsi, less than or equal to about 4,900 cpsi, or less than or equal to about 5,000 cpsi. Ranges expressly disclosed include combinations of the above-enumerated upper and lower limits, e.g., about 900 cpsi to about 5,000 cpsi, about 1,500 cpsi to about 3,000 cpsi, about 1,500 cpsi to about 4,000 cpsi, about 1,400 cpsi to about 3,300 cpsi, etc. Particularly, the substrate has a cell density of about 1,500 cpsi to about 4,000 cpsi.

Exemplary channel geometries in the substrate include, but are not limited to a trapezoidal geometry and a square geometry.

In various aspects, the substrate can be a porous solid. Exemplary porous solids include, but are not limited to a metal oxide, a mixed-metal oxide, a ceramic, a zeolite and combinations thereof. Metal oxides that can be used include, but are not limited to alumina, silica, zirconia and titania. An example of a suitable mixed-metal oxide ceramic includes cordierite. Examples of suitable zeolites include, but are not limited to ZSM-5 and ZSM-58.

In various aspects, the substrate has a porosity of less than or equal to about 40%, less than or equal to about 35%, less than or equal to about 30%, less than or equal to about 25%, less than or equal to about 20%, less than or equal to about 15%, less than or equal to about 10%, less than or equal to about 9%, less than or equal to about 8%, less than or equal to about 7%, less than or equal to about 6%, less than or equal to about 5%, less than or equal to about 4%, less than or equal to about 3%, less than or equal to about 2%, less than or equal to about 1% or less than or equal to about 0.5%. Particularly, the substrate has a porosity of less than or equal to about 30%. Additionally or alternatively, the substrate has a porosity of greater than or equal to about 40%, greater than or equal to about 35%, greater than or equal to about 30%, greater than or equal to about 25%, greater than or equal to about 20%, greater than or equal to about 15%, greater than or equal to about 10%, greater than or equal to about 9%, greater than or equal to about 8%, greater than or equal to about 7%, greater than or equal to about 6%, greater than or equal to about 5%, greater than or equal to about 4%, greater than or equal to about 3%, greater than or equal to about 2%, greater than or equal to about 1% or greater than or equal to about 0.5%. Ranges expressly disclosed include combinations of the above-enumerated upper and lower limits, e.g., about 0.5% to about 40%, about 1% to about 10%, about 2% to about 30%, etc.

Additionally or alternatively, the substrate can be a non-porous solid having a porosity of about 0.0%. Exemplary non-porous solids include, but are not limited to a metal, a glass, and a plastic. The metal can comprise stainless steel and/or aluminum.

B. Coating

In various aspects, the coating can comprise adsorbent particles. The adsorbent particles can have an average diameter of greater than or equal to about 1 µm, greater than or equal to about 2 µm, greater than or equal to about 4 µm, greater than or equal to about 6 µm, greater than or equal to about 8 µm, greater than or equal to about 10 µm, greater than or equal to about 12 µm, greater than or equal to about 14 µm, greater than or equal to about 16 µm, greater than or equal to about 18 µm, greater than or equal to about 20 µm, greater than or equal to about 21 µm, greater than or equal to about 22 µm, greater than or equal to about 23 µm, greater than or equal to about 24 µm, greater than or equal to about 25 µm, greater than or equal to about 26 µm, greater than or equal to about 27 µm, greater than or equal to about 28 µm, greater than or equal to about 29 µm, greater than or equal to about 30 µm, greater than or equal to about 32 µm, greater than or equal to about 34 µm, greater than or equal to about 36 µm, greater than or equal to about 38 µm, greater than or equal to about 40 µm, greater than or equal to about 42 µm, greater than or equal to about 44 µm, greater than or equal to about 46 µm, greater than or equal to about 48 µm or greater than or equal to about 50 µm. Particularly, the adsorbent particles have an average diameter greater than about 20 µm. Additionally or alternatively, the adsorbent particles can have an average diameter of less than or equal to about 1 µm, less than or equal to about 2 µm, less than or equal to about 4 µm, less than or equal to about 6 µm, less than or equal to about 8 µm, less than or equal to about 10 µm, less than or equal to about 12 µm, less than or equal to about 14 µm, less than or equal to about 16 µm, less than or equal to about 18 µm, less than or equal to about 20 µm, less than or equal to about 21 µm, less than or equal to about 22 µm, less than or equal to about 23 µm, less than or equal to about 24 µm, less than or equal to about 25 µm, less than or equal to about 26 µm, less than or equal to about 27 µm, less than or equal to about 28 µm, less than or equal to about 29 µm, less than or equal to about 30 µm, less than or equal to about 32 µm, less than or equal to about 34 µm, less than or equal to about 36 µm, less than or equal to about 38 µm, less than or equal to about 40 µm, less than or equal to about 42 µm, less than or equal to about 44 µm, less than or equal to about 46 µm, less than or equal to about 48 µm or less than or equal to about 50 µm. Ranges expressly disclosed include combinations of the above-enumerated upper and lower limits, e.g., about 1 µm to about 50 µm, about 2 µm to about 40 µm, about 10 µm to about 36 µm, etc. Particularly, the adsorbent particles can have an average diameter of about 2 µm to about 50 µm and/or about 20 µm to about 40 µm.

Additionally or alternatively, the adsorbent particles described herein can generally have a hexagonal disc shape where the particles have hexagonal faces. The top and bottom hexagonal faces can generally correspond to larger hexagonal faces, with a smaller depth dimension (roughly) perpendicular to the top and bottom faces. The hexagonal disc shape of the adsorbent particles can be seen in FIG. 8.

Additionally or alternatively, the adsorbent particles described herein can generally have a rounded or circular disc shape with top and bottom rounded or circular disc faces. The depth dimension for the rounded discs can be smaller than the lateral dimension of the rounded faces of the disc.

One way to characterize the difference between the hexagonal disc shape and the rounded disc shape can be based on the difference between the vertex-to-vertex distance and the edge-to-edge distance in a hexagonal face of a crystal. To perform this type of characterization, an initial step can be to identify the correct face(s) of the particle for performing the characterization. For a hexagonal disc particle, the combination of a vertex-to-vertex line and an edge-to-edge line can roughly define a plane. The dimension perpendicular to this plane can then correspond to the depth of the crystal. For the hexagonal disc shape, this depth dimension can generally be shorter than either the vertex-to-vertex distance or the edge-to-edge distance. If the depth distance is longer than either of the other two distances, then either a different hexagonal face should be selected for this calculation, or the crystal may not correspond to a hexagonal disc shape or round disc shape. After determining that the correct type of hexagonal (or rounded) face has been selected for characterizing the crystal, the vertex-to-vertex distance and the edge-to-edge distance for the hexagonal face can be compared in order to calculate an axis ratio. Additionally or alternatively, the adsorbent particles described herein can be a prismatic shape.

FIG. 1 shows a schematic example of this type of calculation. In FIG. 1, line 110 corresponds to the vertex-to-vertex distance for a hexagon. Line 120 corresponds to the edge-to-edge distance. For a hexagonal face with well defined edges and vertices, the vertex-to-vertex distance, by definition, is typically larger than the edge-to-edge distance. As the angles and edges of the hexagon become smoothed toward forming a circle, to the degree that the vertices and edges can still be identified, the vertex-to-vertex distance and the edge-to-edge distance can become increasingly closer. In the limiting case of a circle, the axis ratio of vertex-to-vertex distance and edge-to-edge distance becomes 1, with the caveat that the location of a "vertex" and an "edge" in the limiting case may be somewhat arbitrary.

Figure 8:
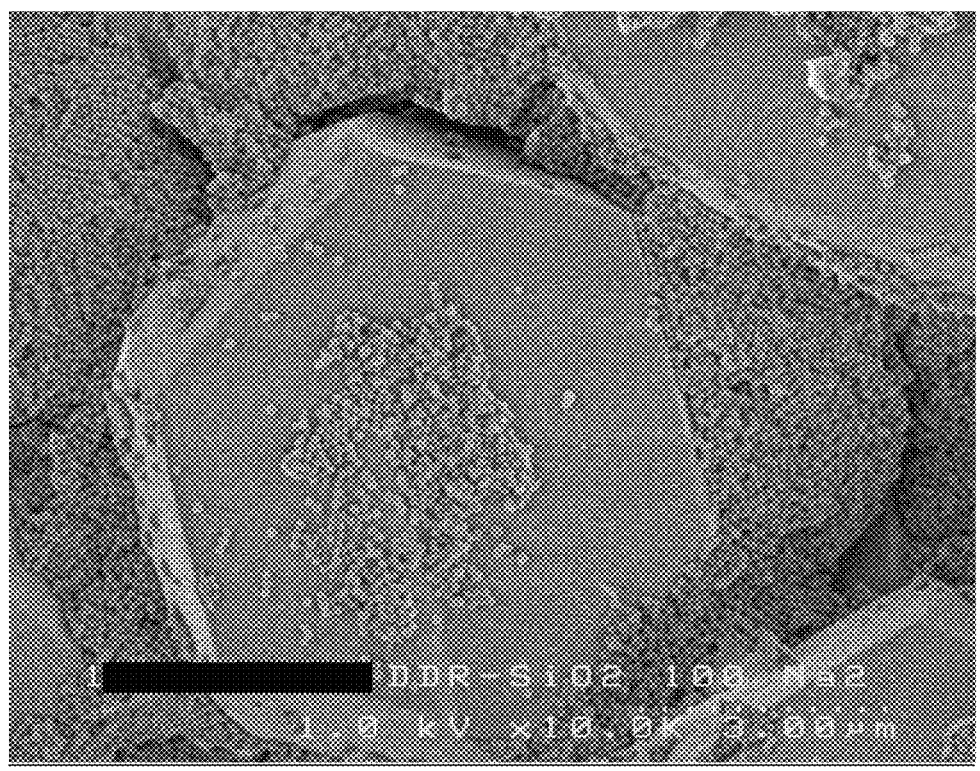
FIG. 8 illustrates an SEM image of a DDR (25-30 μm) and $SiO_2$ (100 nm) coating on a 1440 cpsi metal monolith and/or glass slide after 500° C. calcination.

For adsorbent particles of the type shown in FIG. 8, the ratio of vertex-to-vertex distance versus edge-to-edge distance can be determined based on measuring distances in an SEM micrograph. The adsorbent particles shown in FIG. 8 can be used herein in the coating and the axis ratio of the vertex-to-vertex distance versus the edge-to-edge distance was observed to be at least about 1.15, such as at least about 1.2.

The characterization of the rounded disc shape particles can be performed in a similar manner. The depth dimension can be identified in relation to the rounded (approaching circular) face(s) of the crystal. In some embodiments, a ratio of the depth dimension to the edge-to-edge distance can be about 0.9 or less, e.g., about 0.85 or less. In such embodiments, particles with a ratio of depth dimension to edge-to-edge distance of greater than about 0.95 were identified to correspond to a roughly spherical morphology. The rounded face of the rounded discs can then be characterized using the axis ratio. Additionally or alternatively, the round disc particles can have an axis ratio of the vertex-to-vertex distance versus edge-to-edge distance of about 1.1 or less, e.g., about 1.05 or less, or a still lower value that can approach the limiting axis ratio value of 1.0.

Additionally or alternatively, the adsorbent particles comprise a microporous material, such as a zeolite. The zeolite can have a Si/Al ratio of at least about 200:1, at least about 300:1, at least about 400:1, at least about 500:1, at least about 600:1, at least about 700:1, at least about 800:1, at least about 900:1 or at least about 1,000:1. Particularly, the zeolite can have a Si/Al ratio of about 600:1. Examples of suitable zeolites include, but are not limited to the following zeolite frameworks: CDO, FAU, MFI, DOH, DDR and combinations thereof. Particularly, the zeolite can be DDR. Examples of DDR framework zeolites include, but are not limited to Sigma-1, ZSM-58 and SSZ-28. A person of ordinary skill in the art knows how to make the aforementioned zeolites. For example, see the references provided in the International Zeolite Association's database of zeolite structures found at www.iza-structure.org/databases. Particularly, the DDR framework zeolite can be ZSM-58. For example, ZSM-58 can be formed according to the methods described in U.S. Patent Application Publication No. 2014/0161717, the entirety of which is incorporated by reference. Additionally or alternatively, the DDR framework zeolite can include DDR frameworks formed according to the methods described in U.S. Provisional Patent Application Ser. No. 62/082,210, the entirety of which is incorporated by reference.

Additionally or alternatively, the coating can also comprise a binder. The binder particles are capable of binding the adsorbent particles together to form an aggregate of binder particles and adsorbent particles in the coating. The binder can comprise particles having an average diameter of greater than or equal to about 10 nm, greater than or equal to about 15 nm, greater than or equal to about 20 nm, greater than or equal to about 25 nm, greater than or equal to about 30 nm, greater than or equal to about 35 nm, greater than or equal to about 45 nm, greater than or equal to about 50 nm, greater than or equal to about 55 nm, greater than or equal to about 60 nm, greater than or equal to about 65 nm, greater than or equal to about 70 nm, greater than or equal to about 75 nm, greater than or equal to about 80 nm, greater than or equal to about 85 nm, greater than or equal to about 90 nm, greater than or equal to about 95 nm, greater than or equal to about 100 nm, greater than or equal to about 110 nm, greater than or equal to about 120 nm, greater than or equal to about 130 nm, greater than or equal to about 140 nm, greater than or equal to about 150 nm, greater than or equal to about 160 nm, greater than or equal to about 170 nm, greater than or equal to about 180 nm, greater than or equal to about 190 nm, greater than or equal to about 200 nm, greater than or equal to about 210 nm, greater than or equal to about 220 nm, greater than or equal to about 230 nm, greater than or equal to about 240 nm or greater than or equal to about 250 nm. Additionally or alternatively, the binder can comprise particles can have an average diameter of less than or equal to about 10 nm, less than or equal to about 15 nm, less than or equal to about 20 nm, less than or equal to about 25 nm, less than or equal to about 30 nm, less than or equal to about 35 nm, less than or equal to about 45 nm, less than or equal to about 50 nm, less than or equal to about 55 nm, less than or equal to about 60 nm, less than or equal to about 65 nm, less than or equal to about 70 nm, less than or equal to about 75 nm, less than or equal to about 80 nm, less than or equal to about 85 nm, less than or equal to about 90 nm, less than or equal to about 95 nm, less than or equal to about 100 nm, less than or equal to about 110 nm, less than or equal to about 120 nm, less than or equal to about 130 nm, less than or equal to about 140 nm, less than or equal to about 150 nm, less than or equal to about 160 nm, less than or equal to about 170 nm, less than or equal to about 180 nm, less than or equal to about 190 nm, less than or equal to about 200 nm, less than or equal to about 210 nm, less than or equal to about 220 nm, less than or equal to about 230 nm, less than or equal to about 240 nm or less than or equal to about 250 nm. Ranges expressly disclosed include combinations of the above-enumerated upper and lower limits, e.g., about 10 nm to about 250 nm, about 25 nm to about 200 nm, about 100 nm to about 200 nm, etc. Particularly, the binder particles can have an average diameter of about 100 nm to about 200 nm.

Additionally or alternatively, the binder is basic. The binder can have a pH of greater than or equal to about 7, greater than or equal to about 7.5, greater than or equal to about 8, greater than or equal to about 8.5, greater than or equal to about 9, greater than or equal to about 9.5, greater than or equal to about 10, greater than or equal to about 10.5, greater than or equal to about 11, greater than or equal to about 11.5, greater than or equal to about 12, greater than or equal to about 12.5, greater than or equal to about 13, greater than or equal to about 13.5 or greater than or equal to about 14. Particularly, the binder can have a pH greater than about 7, particularly about 10. Additionally or alternatively, the binder has a pH of less than or equal to about 7, less than or equal to about 7.5, less than or equal to about 8, less than or equal to about 8.5, less than or equal to about 9, less than or equal to about 9.5, less than or equal to about 10, less than or equal to about 10.5, less than or equal to about 11, less than or equal to about 11.5, less than or equal to about 12, less than or equal to about 12.5, less than or equal to about 13, less than or equal to about 13.5 or less than or equal to about 14. Ranges expressly disclosed include combinations of the above-enumerated upper and lower limits, e.g., about 7 to about 14, about 10 to about 12, about 11 to about 13.5, about 11 to about 12.5, etc. Particularly, the pH can be from about 7 to about 11.

Exemplary materials suitable for use as the binder include but are not limited to silica ($SiO_2$) and alumina ($Al_2O_3$). Particularly, the binder can comprise $SiO_2$.

Additionally or alternatively, the coating can be present on the substrate in a thickness of greater than or equal to about 20 μm, greater than or equal to about 30 μm, greater than or equal to about 40 μm, greater than or equal to about 50 μm, greater than or equal to about 60 μm, greater than or equal to about 70 μm, greater than or equal to about 80 μm, greater than or equal to about 90 μm, greater than or equal to about 100 μm, greater than or equal to about 110 μm, greater than or equal to about 120 μm, greater than or equal to about 130 μm, greater than or equal to about 140 μm, greater than or equal to about 150 µm, greater than or equal to about 160 µm, greater than or equal to about 170 µm, greater than or equal to about 180 µm, greater than or equal to about 190 µm, greater than or equal to about 200 µm, greater than or equal to about 210 µm, greater than or equal to about 220 µm, greater than or equal to about 230 µm, greater than or equal to about 240 µm, greater than or equal to about 250 µm, greater than or equal to about 260 µm, greater than or equal to about 270 µm, greater than or equal to about 280 µm, greater than or equal to about 290 µm, or greater than or equal to about 300 µm. Particularly, the coating can be present on the substrate in a thickness of greater than or equal to about 100 µm. Additionally or alternatively, the coating can be present on the substrate in a thickness of less than or equal to about 20 µm, less than or equal to about 30 µm, less than or equal to about 40 µm, less than or equal to about 50 µm, less than or equal to about 60 µm, less than or equal to about 70 µm, less than or equal to about 80 µm, less than or equal to about 90 µm, less than or equal to about 100 µm, less than or equal to about 110 µm, less than or equal to about 120 µm, less than or equal to about 130 µm, less than or equal to about 140 µm, less than or equal to about 150 µm, less than or equal to about 160 µm, less than or equal to about 170 µm, less than or equal to about 180 µm, less than or equal to about 190 µm, less than or equal to about 200 µm, less than or equal to about 210 µm, less than or equal to about 220 µm, less than or equal to about 230 µm, less than or equal to about 240 µm, less than or equal to about 250 µm, less than or equal to about 260 µm, less than or equal to about 270 µm, less than or equal to about 280 µm, less than or equal to about 290 µm, or less than or equal to about 300 µm. Ranges expressly disclosed include combinations of the above-enumerated upper and lower limits, e.g., about 20 µm to about 300 µm, about 30 µm to about 200 µm, about 50 µm to about 100 µm, etc. Particularly, the coating on the substrate can have a thickness of about 30 µm to about 200 µm.

Additionally or alternatively, the coating can comprise one or more layers of adsorbent particles and binder particles. The coating can comprise two or more layers, three or more layers, four or more layers, five or more layers, six or more layers, seven or more layers, eight or more layers, nine or more layers, or ten or more layers of adsorbent particles and binder particles. Additionally or alternatively, the coating can comprise two or fewer layers, three or fewer layers, four or fewer layers, five or fewer layers, six or fewer layers, seven or fewer layers, eight or fewer layers, nine or fewer layers, or ten or fewer layers of adsorbent particles and binder particles. Ranges expressly disclosed include combinations of the above-enumerated upper and lower limits, e.g., one to ten layers, two to eight layers, three to seven layers, etc.

Additionally or alternatively, the coating on the substrate can have a macroporosity of at least about 5%, at least about 10%, at least about 15%, at least about 20%, at least about 25%, at least about 30%, at least about 35%, at least about 40%, at least about 45% or at least about 50%. The coating on the substrate can have a macroporosity of less than about 5%, less than about 10%, less than about 15%, less than about 20%, less than about 25%, less than about 30%, less than about 35%, less than about 40%, less than about 45% or less than about 50%. Ranges expressly disclosed include combinations of the above-enumerated upper and lower limits, e.g., about 5% to about 50%, about 10% to about 40%, about 20% to about 35%, etc. Particularly, the coating on the substrate can have a macroporosity of about 10% to about 40%.

C. Primer Layer

Additionally or alternatively, the adsorbent bed may further comprise a primer layer on the substrate. The primer layer can be present between the substrate and the coating. The primer layer can increase surface roughness of the substrate and/or provide a surface more similar in composition to the adsorbent particles in the coating for increased adhesion and improved bonding of the coating to the substrate. Additionally, when the substrate is a metal, the primer layer can reduce exposure of potentially reactive species on the metal surface and also diminish thermal expansion differences between the metal surface and the coating. The primer layer can be a zirconium-containing layer. Particularly, the zirconium-containing layer can comprise zirconium oxide, zirconium silicate or a combination thereof.

III. Methods of Preparing the Structured Adsorbent Bed

In various aspects, a method of preparing a structured adsorbent bed described herein is provided. The method can comprise pretreating the substrate, preparing an aqueous slurry comprising the adsorbent particles and the binder and applying the aqueous slurry to the substrate to form the coating on the substrate.

Additionally or alternatively, pretreating the substrate can comprise applying a primer layer, such as the zirconium-containing layer described herein. Additionally or alternatively, the substrate can be cleaned prior to application of the primer layer.

Additionally or alternatively, pretreating the substrate can comprise heating the substrate and applying a primer layer, such as the zirconium-containing layer described herein. When the substrate is a metal having no porosity, heating the substrate prior to application of the primer layer results in a micron-thin metal oxide skin, which roughens the metal surface and creates anchoring sites on the metal surface thereby improving adhesion and bonding of the coating. In pretreating the substrate, the substrate can be heated at a temperature of greater than or equal to about 500° C., greater than or equal to about 550° C., greater than or equal to about 600° C., greater than or equal to about 650° C., greater than or equal to about 700° C., greater than or equal to about 750° C., greater than or equal to about 800° C., greater than or equal to about 850° C., greater than or equal to about 900° C., greater than or equal to about 950° C., greater than or equal to about 1,000° C., greater than or equal to about 1,050° C., greater than or equal to about 1,100° C., greater than or equal to about 1,150° C., greater than or equal to about 1,200° C., greater than or equal to about 1,250° C., or greater than or equal to about 1,300° C. Additionally or alternatively, the substrate can be heated at a temperature of less than or equal to about 500° C., less than or equal to about 550° C., less than or equal to about 600° C., less than or equal to about 650° C., less than or equal to about 700° C., less than or equal to about 750° C., less than or equal to about 800° C., less than or equal to about 850° C., less than or equal to about 900° C., less than or equal to about 950° C., less than or equal to about 1,000° C., less than or equal to about 1,050° C., less than or equal to about 1,100° C., less than or equal to about 1,150° C., less than or equal to about 1,200° C., less than or equal to about 1,250° C., or less than or equal to about 1,300° C. Ranges expressly disclosed include combinations of the above-enumerated upper and lower limits, e.g., about 500° C. to about 1,300° C., about 600° C. to about 1,100° C., about 900° C. to about 1050° C., etc. The substrate can be heated at a temperature of about 600° C. to about 1,100° C., particularly about 900° C.

Additionally or alternatively, the substrate can be pre-treated by heating the substrate for at least about 1 hour, at least about 2 hours, at least about 3 hours, at least about 4 hours, at least about 5 hours, at least about 6 hours, at least about 7 hours, at least about 8 hours, at least about 9 hours or at least about 10 hours, particularly at least about 6 hours. Alternatively or additionally, the substrate can be heated for less than about 1 hour, less than about 2 hours, less than about 3 hours, less than about 4 hours, less than about 5 hours, less than about 6 hours, less than about 7 hours, less than about 8 hours, less than about 9 hours or less than about 10 hours. Ranges expressly disclosed include combinations of the above-enumerated upper and lower limits, e.g., about 1 hour to about 10 hours, about 1 hour to about 2 hours, about 2 hours to about 6 hours, etc.

Additionally or alternatively, the aqueous slurry can comprise the adsorbent particles and the binder, both as described herein, in a weight ratio from about 70:30 w/w to about 90:10 w/w. Particularly, the weight ratio of adsorbent particles to binder in the aqueous slurry can be about 80:20 w/w or about 90:10 w/w. Particularly, the binder in the aqueous slurry can be $SiO_2$. Additionally or alternatively, the aqueous slurry can include viscosity modifiers, water and/or dispersants.

Coating adhesion, particle cohesion and uniformity depend on slurry properties. Further, the size of the suspended particles has a great influence on the stability of the suspension and adhesion to the substrate. In one aspect, the adsorbent particles in the slurry have an average diameter of greater than or equal to about 25 μm. Additionally or alternatively, the binder particles in the slurry have an average diameter of from about 100 nm to about 200 nm. The aqueous slurry as described herein can be stable for many hours, for example about 5, about 10, about 15, about 20, about 25, about 30 hours if stirred and minutes if not stirred. Further, the aqueous slurry can have a pH of about 7 to about 10 and an approximate viscosity of 14.4 cP. Additionally or alternatively, the aqueous slurry can also include organic additives for controlling rheology of the slurry and/or to act as temporary binding aids.

Additionally or alternatively, the aqueous slurry can be applied to the substrate by dip coating techniques, pulling the slurry into the substrate with a vacuum and/or pumping the slurry into the substrate. Multiple coatings of the aqueous slurry can be applied to the substrate, for example, at least one coating, at least two coatings, at least three coatings, at least four coatings, at least five coatings, at least six coatings, at least seven coatings, at least eight coatings, at least nine coatings or at least ten coatings.

Additionally or alternatively, the method further comprises removing excess coating from the coated substrate, drying the coated substrate and/or heating the coated substrate.

Removing the excess coating in a high cell density substrate (e.g., monoliths) can be difficult due to the high capillary forces within the cells as result of the smaller channel diameter (e.g., 400 μm) of the high cell density substrates. To remove excess coating from the channels in the substrate, the pressure drop across the substrate must be greater than the capillary force through the channel. Thus, in one aspect, the excess coating can be removed from the substrate by flowing a gas, such as nitrogen, through the coated substrate at a rate greater than or equal to about 100 L/min, greater than or equal to about 150 L/min, greater than or equal to about 200 L/min, or greater than or equal to about 250 L/min. Particularly, the gas can be flowed through the substrate at a rate greater than or equal to about 100 L/min. Additionally or alternatively, the gas can be flowed through the substrate at a rate lesser than or equal to about 100 L/min, lesser than or equal to about 150 L/min, lesser than or equal to about 200 L/min, or lesser than or equal to about 250 L/min. Ranges expressly disclosed include combinations of the above-enumerated upper and lower limits, e.g., about 100 L/min to about 250 L/min, about 100 L/min to about 200 L/min, etc.

Additionally or alternatively, drying the coated substrate can comprise flash drying the coated substrate. The gas flowed through the substrate at a high flow rate to remove excess coating can result in rapid evaporative cooling of the slurry in the channels. This can lead to slower water evaporation and drying of the slurry, which can contribute to "bridging," resulting in channels being blocked by unstable, mobile slurry particles bridging the cell diameter in the monoliths and drying into plugs. Flash drying the coated substrate may stabilize the coating films and prevent "bridging" and size segregation of the zeolite and binder particles upon vertical standing. The flash drying can comprise heating a gas purge, such as the same gas used to remove the excess coating, to about 40° C., about 45° C., about 50° C., about 55° C., about 60° C., about 65° C. or about 70° C., particularly between about 50° C. and about 60° C. The heated gas purge can be flowed through the coated substrate at a rate of at least about 100 L/min, at least about 150 L/min, at least about 200 L/min, or at least about 250 L/min. Particularly, the heated purge gas can be flowed through the substrate at a rate of at least about 100 L/min. Additionally or alternatively, the heated gas purge can be flowed through the coated substrate at a rate of no greater than about 100 L/min, no greater than about 150 L/min, no greater than about 200 L/min, or no greater than about 250 L/min. Ranges expressly disclosed include combinations of the above-enumerated upper and lower limits, e.g., about 100 L/min to about 250 L/min, about 100 L/min to about 200 L/min, etc.

Additionally or alternatively, the method further comprises calcining the coated substrate, which optionally, can be performed after the coated substrate is dried. The calcining can be performed in air. The calcining can be performed at a temperature suitable for degrading and/or removing substantially all of the volatile organic components and water in the structured adsorbent bed, for example, at least about 300° C., at least about 350° C., at least about 400° C., at least about 450° C., about 500° C., at least about 550° C. or at least about 600° C. Additionally or alternatively, the calcining can be performed at a temperature of less than about 300° C., less than about 350° C., less than about 400° C., less than about 450° C., less than about 500° C., less than about 550° C. or less than about 600° C. Ranges expressly disclosed include combinations of the above-enumerated upper and lower limits, e.g., about 300° C. to about 600° C., about 350° C. to about 450° C., about 300° C. to about 500° C., etc. Particularly, the calcining is performed at a temperature of about 500° C., optionally using a heating ramp, such as: a) drying at about 120° C. for about 8 hours; b) increasing the temperature to about 500° C. over about 4 hours; c) holding at about 500° C. for about 2 hours; and d) cooling to about 120° C. over about 2 hours.

IV. Gas Separation Processes

In various aspects, a gas separation process is provided herein. The gas separation process comprises contacting a gas mixture containing at least one contaminant with a structured adsorbent bed as described herein.

In various aspects, the gas separation process can be achieved by swing adsorption processes, such as pressure swing adsorption (PSA) and temperature swing adsorption (TSA). All swing adsorption processes have an adsorption step in which a feed mixture (typically in the gas phase) is flowed over an adsorbent that preferentially adsorbs a more readily adsorbed component relative to a less readily adsorbed component. A component may be more readily adsorbed because of kinetic or equilibrium properties of the adsorbent. The adsorbent can typically be contained in a contactor that is part of the swing adsorption unit. The contactor can typically contain an engineered structured adsorbent bed or a particulate adsorbent bed. The bed can contain the adsorbent and other materials such as other adsorbents, mesopore filling materials, and/or inert materials used to mitigate temperature excursions from the heat of adsorption and desorption. Other components in the swing adsorption unit can include, but are not necessarily limited to, valves, piping, tanks, and other contactors.

PSA processes rely on the fact that gases under pressure tend to be adsorbed within the pore structure of the adsorbent materials. Typically, the higher the pressure, the greater the amount of targeted gas component that will be adsorbed. When the pressure is reduced, the adsorbed targeted component is typically released, or desorbed. PSA processes can be used to separate gases of a gas mixture, because different gases tend to fill the pores or free volume of the adsorbent to different extents due to either the equilibrium or kinetic properties of the adsorbent. In many important applications, to be described as "equilibrium-controlled" processes, the adsorptive selectivity is primarily based upon differential equilibrium uptake of the first and second components. In another important class of applications, to be described as "kinetic-controlled" processes, the adsorptive selectivity is primarily based upon the differential rates of uptake of the first and second components.

If a gas mixture, such as natural gas, is passed under pressure through a vessel containing a polymeric or microporous adsorbent that is more selective towards carbon dioxide than it is for methane, at least a portion of the carbon dioxide can be selectively adsorbed by the adsorbent, and the gas exiting the vessel can be enriched in methane. When the adsorbent reaches the end of its capacity to adsorb carbon dioxide, it can be regenerated by reducing the pressure, thereby releasing the adsorbed carbon dioxide. The adsorbent can then typically purged and repressurized and ready for another adsorption cycle.

TSA processes also rely on the fact that gases under pressure tend to be adsorbed within the pore structure of the adsorbent materials. When the temperature of the adsorbent is increased, the adsorbed gas is typically released, or desorbed. By cyclically swinging the temperature of adsorbent beds, TSA processes can be used to separate gases in a mixture when used with an adsorbent selective for one or more of the components in a gas mixture. Partial pressure purge displacement (PPSA) swing adsorption processes regenerate the adsorbent with a purge. Rapid cycle (RC) swing adsorption processes complete the adsorption step of a swing adsorption process in a short amount of time. For kinetically selective adsorbents, it can be preferable to use a rapid cycle swing adsorption process. If the cycle time becomes too long, the kinetic selectivity can be lost. These swing adsorption protocols can be performed separately or in combinations. Examples of processes that can be used herein either separately or in combination are PSA, TSA, pressure temperature swing adsorption (PTSA), partial purge displacement swing adsorption (PPSA), PPTSA, rapid cycle PSA (RCPSA), RCTSA, vacuum pressure swing adsorption (VPSA), RCPPSA and RCPTSA.

In PSA processes, a feed gas mixture containing the first and second gas components is separated by cyclic variations of pressure coordinated with cyclic reversals of flow direction in a flow path contacting a fixed bed of the adsorbent material in an adsorber vessel. In the case of TSA or PPSA processes, cyclic variations of temperature and/or partial pressure of the gas components may be coordinated with gas flow through a flow path to perform a separation. The process in any specific PSA application operates at a cyclic frequency characterized by its period, and over a pressure envelope between a first relatively higher pressure and a second relatively lower pressure. Separation in PSA is achieved by coordinating the pressure variations with the flow pattern within the flow path, so that the gas mixture in the flow path is enriched in the second component (owing to preferential adsorptive uptake of the first component in the adsorbent material) when flowing in a first direction in the flow path, while the gas mixture is enriched in the first component (which has been desorbed by the adsorbent material) when flowing in the opposite direction in the flow path. In order to achieve separation performance objectives (i.e. product gas purity, recovery and productivity), process parameters and operating conditions should be designed to achieve a sufficiently high adsorptive selectivity of the first and second components over the adsorbent material, at the cyclic frequency and within the pressure envelope.

Swing adsorption processes can be applied to remove a variety of target gases, also referred to as a "contaminant gas" from a wide variety of gas mixtures. The "light component" as utilized herein is taken to be the species or molecular component(s) not preferentially taken up by the adsorbent in the adsorption step of the process. Conversely, the "heavy component" as utilized herein is taken to be the species or molecular component(s) preferentially taken up by the adsorbent in the adsorption step of the process.

An example of a gas mixture that can be separated in the methods described herein is a gas mixture comprising $CH_4$, such as a natural gas stream. A gas mixture comprising $CH_4$ can contain significant levels of contaminants such as $H_2O$, $H_2S$, $CO_2$, $N_2$, mercaptans, and/or heavy hydrocarbons. Additionally or alternatively, the gas mixture can comprise $NO_x$ and/or $SO_x$ species as contaminants, such as a waste gas stream, a flue gas stream and a wet gas stream. As used herein, the terms "$NO_x$" and "$NO_x$ species" refers to the various oxides of nitrogen that may be present in waste gas, such as waste gas from combustion processes. The terms refer to all of the various oxides of nitrogen including, but not limited to, nitric oxide (NO), nitrogen dioxide ($NO_2$), nitrogen peroxide ($N_2O$), nitrogen pentoxide ($N_2O_5$), and mixtures thereof. As used herein, the terms "$SO_x$" and "SOx species" refers to various oxides of sulfur that may be present in waste gas, such as waste gas from combustion processes. The terms refer to all of the various oxides of sulfur including, but not limited to, SO, $SO_2$, $SO_3$, $SO_4$, $S_7O_2$ and $S_6O_2$. Thus, examples of contaminants include, but are not limited to $H_2O$, $H_2S$, $CO_2$, $N_2$, mercaptans, heavy hydrocarbons, $NO_x$ and/or $SO_x$ species.

In the practice of the present invention, it may be desirable to operate with a multiplicity of structured adsorbent beds, with several coupled in a heating/cooling operation and others involved in adsorption (and/or desorption). In such an operation, the adsorbent bed can be substantially cooled by a circulating heat transfer medium before it is switched into service for adsorption. One advantage of such an operation can be that the thermal energy used to swing the bed is retained in the heat transfer medium. If adsorption were to proceed simultaneously with cooling, then a substantial part of the heat in the bed could be lost to the adsorbate-free feed, and a higher heat load could be needed to restore the high temperature of the heat transfer medium.

Adsorptive kinetic separation (AKS) processes, as described above, are useful for development and production of hydrocarbons, such as gas and oil processing. Particularly, as described in U.S. Patent Application Publication No. 2013/032716, which is herein incorporated by reference in its entirety, the AKS processes described herein can use one or more kinetic swing adsorption process, such as pressure swing adsorption (PSA), thermal swing adsorption (TSA), calcination, and partial pressure swing or displacement purge adsorption (PPSA), including combinations of these processes; each swing adsorption process may be utilized with rapid cycles, such as using one or more rapid cycle pressure swing adsorption (RC-PSA) units, with one or more rapid cycle temperature swing adsorption (RC-TSA) units or with one or more rapid cycle partial pressure swing adsorption (RC-PPSA) units; exemplary kinetic swing adsorption processes are described in U.S. Pat. Nos. 7,959,720; 8,545,602; 8,529,663; 8,444,750; and 8,529,662 and U.S. Provisional Application Nos. 61/448,121; 61/447,848; 61/447,869; and 61/447,877, which are each herein incorporated by reference in its entirety. The provided processes, can be useful for rapid, large scale, efficient separation of a variety of target gases from gas mixtures.

The provided processes and apparatuses may be used to prepare natural gas products by removing contaminants. The provided processes and apparatuses can be useful for preparing gaseous feed streams for use in utilities, including separation applications such as dew point control, sweetening/detoxification, corrosion protection/control, dehydration, heating value, conditioning, and purification. Examples of utilities that utilize one or more separation applications can include generation of fuel gas, seal gas, non-potable water, blanket gas, instrument and control gas, refrigerant, inert gas, and hydrocarbon recovery. Exemplary "not to exceed" product (or "target") acid gas removal specifications can include: (a) 2 vol % $CO_2$, 4 ppm $H_2S$; (b) 50 ppm $CO_2$, 4 ppm $H_2S$; or (c) 1.5 vol % $CO_2$, 2 ppm $H_2S$.

The provided processes and apparatuses may also be used to remove acid gas from hydrocarbon streams. Acid gas removal technology becomes increasingly important as remaining gas reserves exhibit higher concentrations of acid (sour) gas resources. Hydrocarbon feed streams can vary widely in amount of acid gas, such as from several parts per million to 90 vol %. Non-limiting examples of acid gas concentrations from exemplary gas reserves can include concentrations of at least: (a) 1 vol % $H_2S$, 5 vol % $CO_2$; (b) 1 vol % $H_2S$, 15 vol % $CO_2$; (c) 1 vol % $H_2S$, 60 vol % $CO_2$; (d) 15 vol % $H_2S$, 15 vol % $CO_2$; or (e) 15 vol % $H_2S$, 30 vol % $CO_2$.

One or more of the following may be utilized with the processes and apparatuses provided herein, to prepare a desirable product stream, while maintaining relatively high hydrocarbon recovery:

(a) removing acid gas with RC-TSA using advanced cycles and purges as described in U.S. Provisional Application No. 61/447,854, filed Mar. 1, 2011, as well as the U.S. Pat. No. 8,784,533, which are together incorporated by reference herein in their entirety;

(b) using a mesopore filler to reduce the amount of trapped methane in the adsorbent bed and increase the overall hydrocarbon recovery, as described in U.S. Pat. Nos. 7,959,720; 8,444,750; and 8,529,663, each of which is herein incorporated by reference in its entirety;

(c) depressurizing one or more RC-TSA units in multiple steps to intermediate pressures so that the acid gas exhaust can be captured at a higher average pressure, thereby decreasing the compression required for acid gas injection; pressure levels for the intermediate depressurization steps may be matched to the interstage pressures of the acid gas compressor to optimize the overall compression system;

(d) using exhaust or recycle streams to minimize processing and hydrocarbon losses, such as using exhaust streams from one or more RC-TSA units as fuel gas instead of re-injecting or venting;

(e) using multiple adsorbent particles in a single bed to remove trace amounts of first contaminants, such as $H_2S$, before removal of a second contaminant, such as $CO_2$; such segmented beds may provide rigorous acid gas removal down to ppm levels with RC-TSA units with minimal purge flow rates;

(f) using feed compression before one or more RC-TSA units to achieve a desired product purity;

(g) contemporaneous removal of non-acid gas contaminants such as mercaptans, COS, and BTEX; selection processes and materials to accomplish the same;

(h) selecting a cycle time and cycle steps based on adsorbent material kinetics; and (i) using a process and apparatus that uses, among other equipment, two RC-TSA units in series, wherein the first RC-TSA unit cleans a feed stream down to a desired product purity and the second RC-TSA unit cleans the exhaust from the first unit to capture methane and maintain high hydrocarbon recovery; use of this series design may reduce the need for a mesopore filler.

The processes, apparatuses, and systems provided herein can be useful in large gas treating facilities, such as facilities that process more than five million standard cubic feet per day (MSCFD) of natural gas, for example more than 15 MSCFD, more than 25 MSCFD, more than 50 MSCFD, more than 100 MSCFD, more than 500 MSCFD, more than one billion standard cubic feet per day (BSCFD), or more than two BSCFD.

V. Further Embodiments

The invention can additionally or alternately include one or more of the following embodiments.

Embodiment 1

A structured adsorbent bed for purification of a gas feedstream comprising: a substrate having a cell density greater than 1040 cpsi; and a coating on the substrate, wherein the coating comprises adsorbent particles and a binder.

Embodiment 2

The structured adsorbent bed of embodiment 1, wherein the adsorbent particles have an average diameter of about 2 µm to about 40 µm.

Embodiment 3

The structured adsorbent bed of embodiment 1, wherein the adsorbent particles have an average diameter greater than about 20 µm.

Embodiment 4

The structured adsorbent bed of any of the previous embodiments, wherein the adsorbent particles have an axis ratio of at least 1.2.

Embodiment 5

The structured adsorbent bed of any of the previous embodiments, wherein the adsorbent particles comprise a microporous material.

Embodiment 6

The structured adsorbent bed of embodiment 5, wherein the microporous material comprises a zeolite, such as DDR (e.g., Sigma-1 and ZSM-58).

Embodiment 7

The structured adsorbent bed of any of the previous embodiments, wherein the binder comprises particles having an average diameter of about 25 nm to about 200 nm, particularly 100 nm to about 200 nm.

Embodiment 8

The structured adsorbent bed of any of the previous embodiments, wherein the binder has a pH greater than 7.

Embodiment 9

The structured adsorbent bed of any of the previous embodiments, wherein the binder comprises $SiO_2$.

Embodiment 10

The structured adsorbent bed of any of the previous embodiments, wherein the substrate has a cell density of about 1400 cpsi or greater.

Embodiment 11

The structured adsorbent bed of any of the previous embodiments, wherein the substrate has a cell density of about 1500 cpsi to about 4000 cpsi.

Embodiment 12

The structured adsorbent bed of any of the previous embodiments, wherein the coating on the substrate has a thickness of at least 100 μm or greater.

Embodiment 13

The structured adsorbent bed of embodiment 1, wherein the coating on the substrate has a thickness of about 30 μm to about 200 μm.

Embodiment 14

The structured adsorbent bed of any of the previous embodiments, wherein the substrate is a porous solid selected from the group consisting of a metal oxide, a mixed-metal oxide, a ceramic and a zeolite and/or has a porosity of about 30% or less, or alternatively the substrate is a non-porous solid selected from the group consisting of a metal (e.g., stainless steel), a glass and a plastic.

Embodiment 15

The structured adsorbent bed of any of the previous embodiments further comprising a zirconium-containing layer (e.g., zirconium oxide, zirconium silicate and/or a combination thereof).

Embodiment 16

A method of preparing the structured adsorbent bed of any of the previous embodiments, the method comprising: pretreating the substrate; and/or preparing an aqueous slurry comprising the adsorbent particles and the binder; and/or applying the aqueous slurry to the substrate to form the coating on the substrate.

Embodiment 17

The method of embodiment 16, wherein pretreating the substrate comprises: (i) applying the zirconium-containing layer (e.g., zirconium oxide, zirconium silicate and/or a combination thereof) to the substrate; or (ii) heating the substrate, particularly at about 600° C. to about 1100° C., and applying the zirconium-containing layer to the substrate.

Embodiment 18

The method of embodiment 16 or 17, wherein the binder is $SiO_2$.

Embodiment 19

The method of embodiment 16, 17, or 18 wherein the weight ratio of the adsorbent particles to the binder is from about 70:30 w/w to about 90:10 w/w.

Embodiment 20

The method of embodiment 16, 17, 18, or 19 further comprising: removing excess coating from the coated substrate; and/or drying the coated substrate; and/or heating the coated substrate.

Embodiment 21

The method of embodiment 20, wherein the excess coating is removed from the substrate by flowing a gas through the coated substrate at a rate equal to or greater than about 100 L/min.

Embodiment 22

The method of embodiment 20, wherein drying the coated substrate comprises flash drying the coated substrate wherein a gas purge heated from about 50° C. to about 60° C. is flowed through the coated substrate at rate of at least 100 L/min.

Embodiment 23

The method of embodiments 16, 17, 18, 19, 20, 21, or 22 wherein the coating has about 10% to about 40% macroporosity.

Embodiment 24

A gas separation process comprising contacting a gas mixture containing at least one contaminant with the structured adsorbent bed of embodiments 1, 2, 3, 4, 5, 6, 7, 8, 9, 10, 11, 12, 13, 14, or 15.

Embodiment 25

The gas separation process of embodiment 24, wherein the gas mixture comprises $CH_4$ and/or the at least one contaminant is selected from the group consisting $CO_2$, $H_2O$, $H_2S$, $NO_x$ and $SO_x$.

Embodiment 26

The gas separation process of embodiment 24 or 25, wherein the process comprises PSA, TSA, PPSA, PTSA, RCPSA, RCTSA, RCPPSA or RCPTSA.

EXAMPLES

The following examples are merely illustrative, and do not limit this disclosure in any way.

Example 1—Synthesis

Figure 2A:
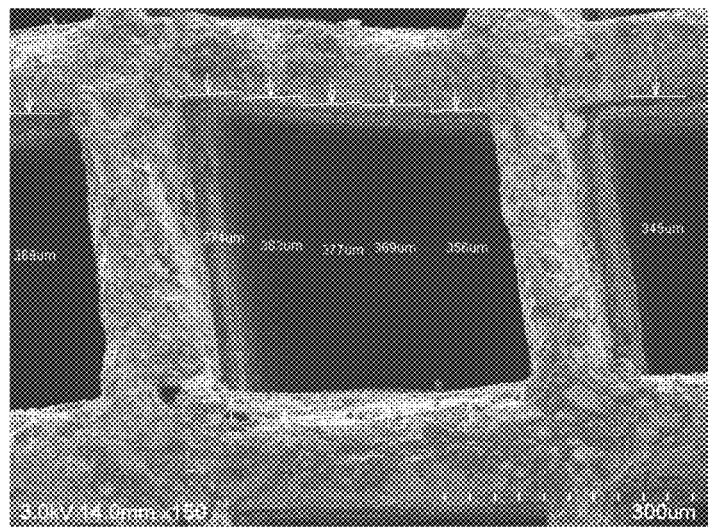
FIGS. 2a and 2b illustrate SEM images for a 2700 cpsi ceramic monolith.
Figure 2B:
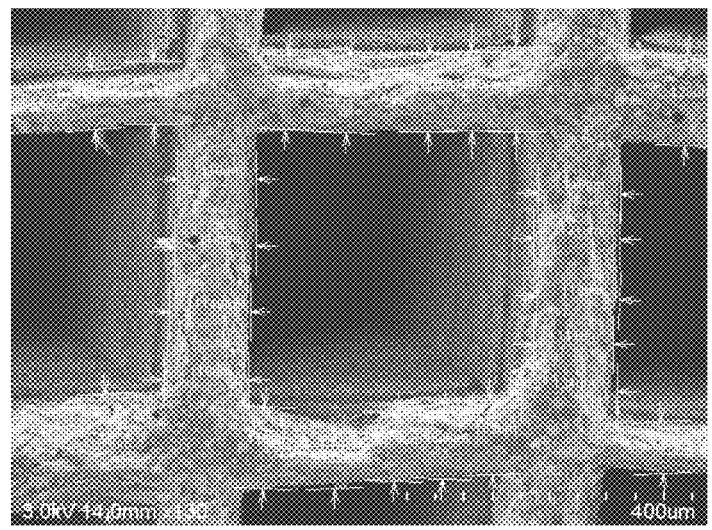

1. Materials
Substrates
High cell density metal and ceramic substrates were obtained as follows:
  Spiral-wound 316 stainless steel monoliths were obtained from Catacel Corporation. The metal monoliths were ~6 inches long and had diameters of ~1.1 inches. Cell densities of the metal monoliths included ~1440 cpsi and ~2918 cpsi. The monoliths were a corrugated foil matrix which consisted of flat-on-corrugated sheets that were wound around a central pin. The structures were brazed and tack welded for mechanical strength. The individual cells within the monolith had a trapezoidal geometry. The cell dimensions of the ~1440 cpsi monoliths were approximately 0.55 mm×0.55 mm. The cell dimensions of the ~2918 cpsi monoliths were approximately 0.38×0.42 mm.
  Very low porosity ceramic monoliths (<6% wall porosity) consisting of pure $Al_2O_3$ were obtained from Applied Ceramics Company. The ceramic monoliths were ~6 inches long with diameters of ~1.1 inches. The cell densities of the ceramic monoliths included ~1500 cpsi and ~2700 cpsi. The individual cells had a square geometry. The cell dimensions of the ~1500 cpsi monoliths were approximately 0.55 mm×0.55 mm. The cell dimensions of the ~2700 cpsi monoliths were approximately 0.40×0.40 mm. Scanning electron microscope (SEM) images of the ~2700 cpsi ceramic monolith is shown in FIGS. 2a and 2b.
Adsorbent Materials:
  DDR zeolites prepared according to the methods described in U.S. Patent Application Publication No. 2014/0161717 with a Si/Al ratio of ~600:1 and a $SiO_2/Al_2O_3$ ratio of ~300:1 were used in the coating formulations. The particle sizes of the DDR zeolites were very large, with the average particle diameter in the range of ~25 μm to ~30 μm.

2. Pre-Treatment of Substrate
Two pre-treatment options were used:
  (i) A Zr-based primer layer was applied as a first layer to the metal and the ceramic monoliths. The metal structures were first cleaned with a phosphate solution (i.e., ~1% trisodium phosphate solution) to remove any processing oils. The ceramic structures were pre-cleaned with acetone, ethanol and water separately to remove any processing materials; or
  (ii) A high temperature thermal oxidation treatment was performed on the metal monoliths followed by an application of the Zr-based primer.

The metal monoliths, with 0% wall porosity, and the ceramic substrates, with very low wall porosity, were pre-treated before coating to increase adhesion of the adsorbent layer and, thus, increase the lifetime of the structured adsorbent.

Figure 3:
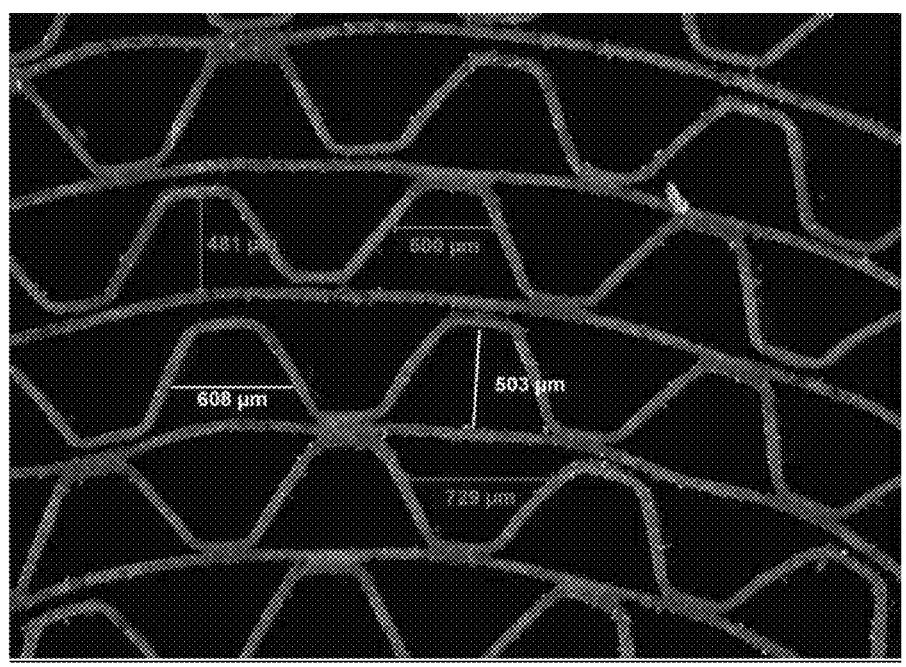
FIG. 3 illustrates a Leica Optical scope picture with 40× magnification of a 1440 cpsi 315 stainless steel monolith after 900° C. calcination.

The surface of the metal monoliths were modified by a high temperature (i.e., ~900° C.~1050° C., for ~6 hours) thermal treatment in air to develop a micron-thin metal oxide skin, useful for roughening the surface and creating anchoring sites. An SEM image of the ~1440 cpsi metal monolith after pre-treatment at ~900° C. is shown in FIG. 3. Following this process, a thin coating of a Zr-based oxide (Aremco 644-N, diluted with 12% $H_2O$), was applied by a dip-coating process to apply the primer layer.

The surface of the ceramic monoliths were primed with the Aremco 644-N to increase surface roughness and anchoring sites on the glass-like, very low porosity walls to improve adhesion of the adsorbent layer.

Figure 4A:
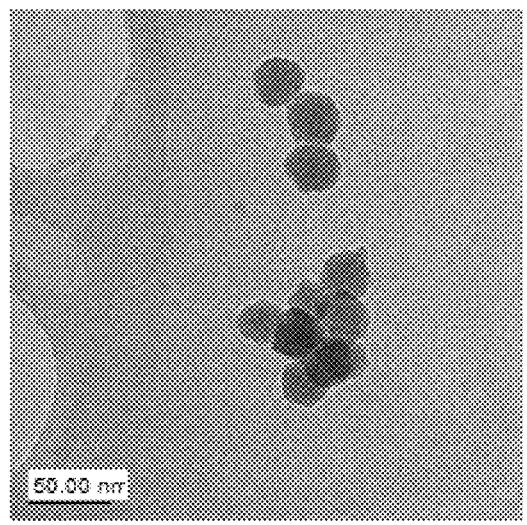
FIGS. 4a and 4b illustrate a transmission electron microscopy (TEM) image and size analysis results showing average diameter of the binder, 25 nm colloidal $SiO_2$.
Figure 4B:
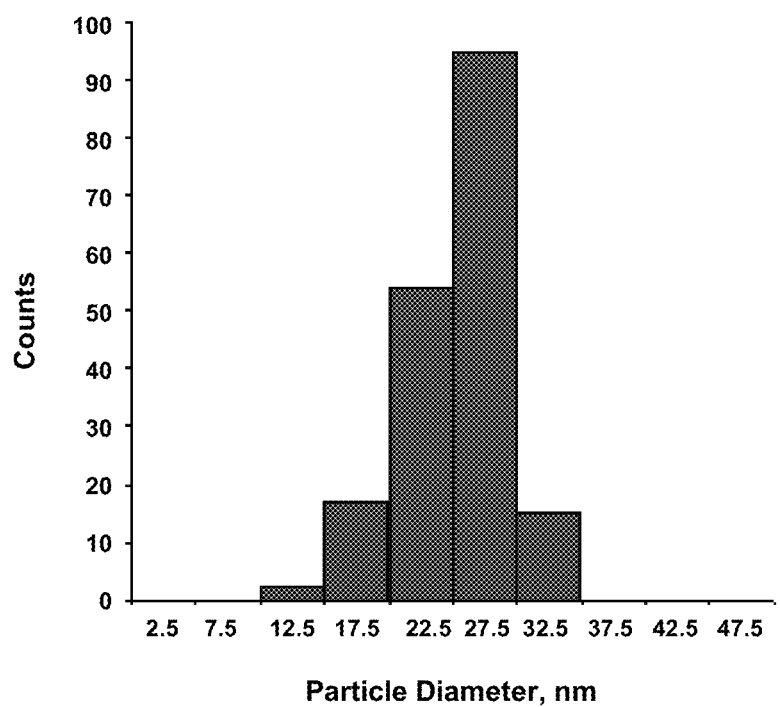
Figure 5A:
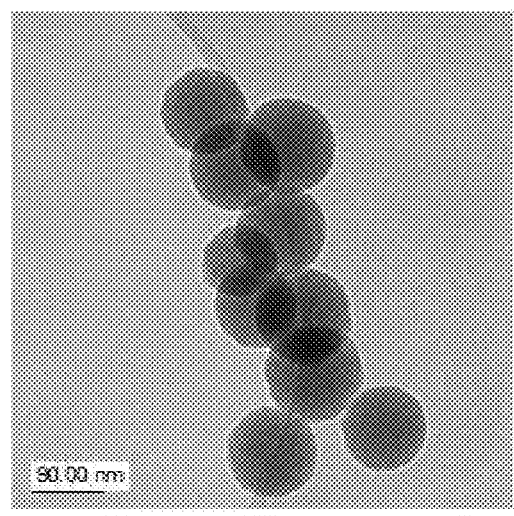
FIGS. 5a and 5b illustrate TEM image and size analysis results showing average diameter of the binder, 100 nm colloidal $SiO_2$.
Figure 5B:
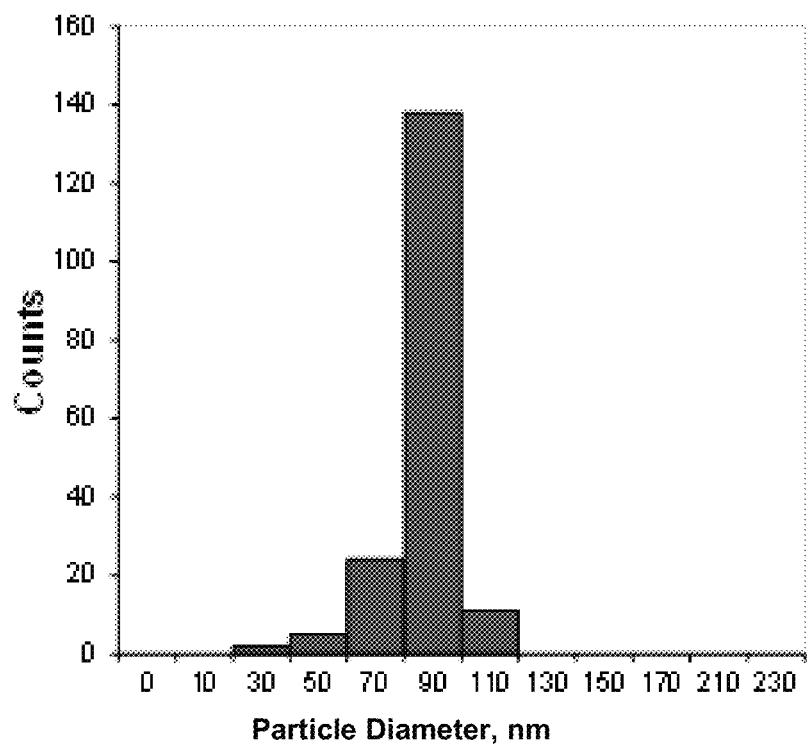
Figure 6A:
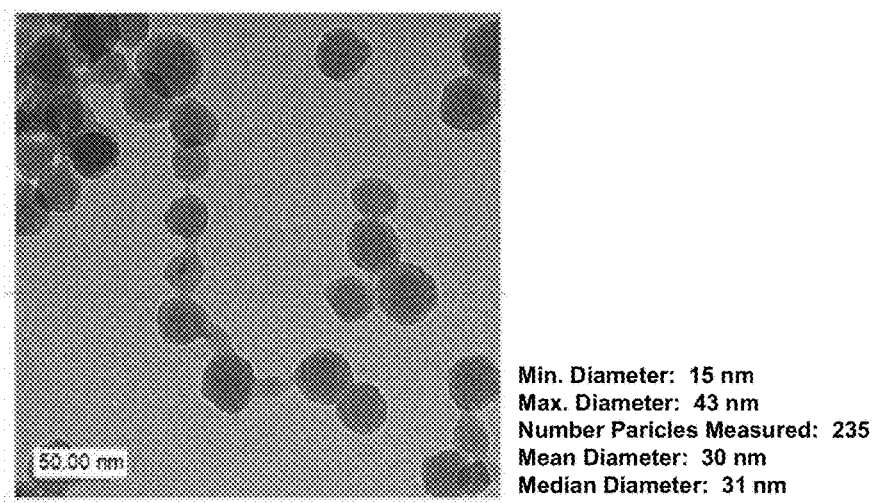
FIGS. 6a and 6b illustrate a TEM image and size analysis results showing average diameter of the binder, string of pearls colloidal $SiO_2$.
Figure 6B:
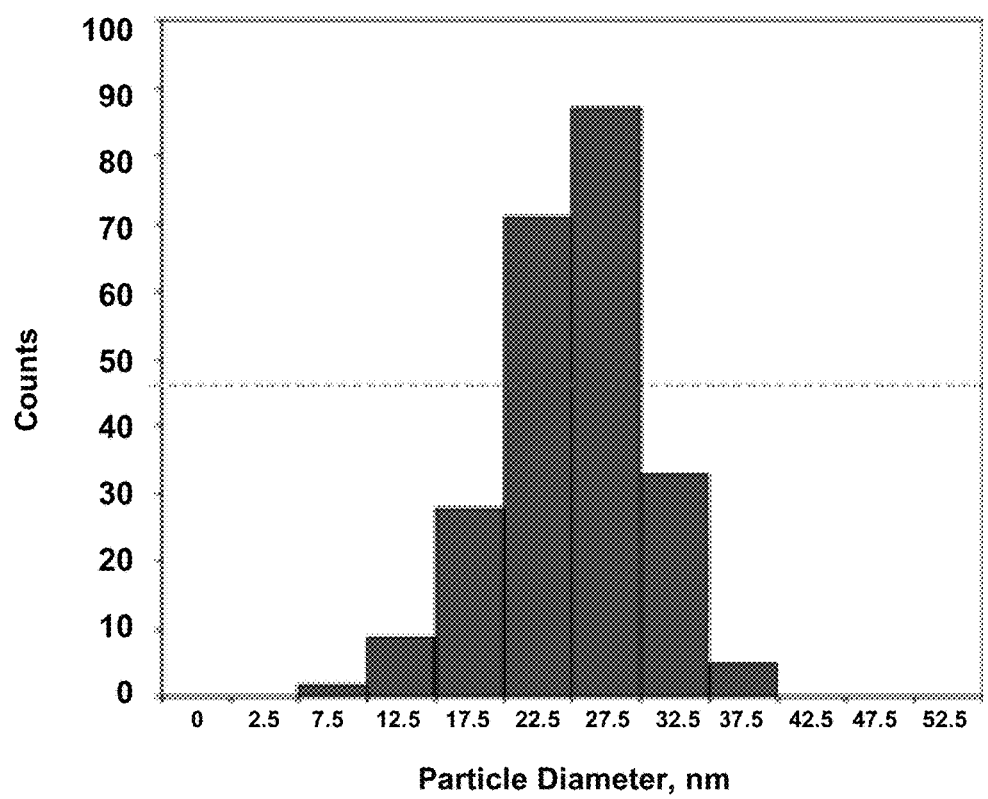

3. Coating
Slurry Preparation
  An aqueous slurry was prepared with ~35 weight % solids content by adding deionized water (~40.413 g), colloidal $SiO_2$ (Nissan Chemicals US, MP-1040, ~100 nm diameter $SiO_2$, ~40 wt % solids, ~5.942 g), DDR adsorbent (prepared according to the methods described in U.S. Patent Application Publication No. 2014/0161717) (~25 μm to ~30 μm average diameter particles, 22.050 g), ~0.5% sodium silicate solution (EMD Corp., ~29% $SiO_2$, ~9% $Na_2O$, ~0.253 g), ~2 wt % of 2% aqueous methyl cellulose solution (Dow Methocel ~240 S, ~1.422 g) and ~3 mole % methanol (~2.43 gm methanol). FIGS. 4-6 provide transmission electron microscopy (TEM) images and particle diameter graphs of the ~100 nm colloidal $SiO_2$ binder used as well as other binders utilized, specifically ~25 nm colloidal $SiO_2$, and string of pearls colloidal $SiO_2$.

The methyl cellulose was used for viscosity control, slurry stabilization, to aid in uniform film formation, and as a lubricity agent to improve removal of excess slurry in ultra-fine channels that have associated very high capillary forces. Methanol was used to aid particle dispersion (to avoid particle agglomeration) due to its surface activity. The ratio of DDR adsorbent to total $SiO_2$ added was ~90:10 weight/weight. The slurry was mixed using a FlackTek asymmetric centrifugal lab mixer for ~1 minute at ~2200 rpm to obtain a homogeneously dispersed mixture. The prepared slurry had a viscosity of ~14 cP and a final pH of approximately 11.

Coating
  The ultra-high density monoliths were dipped into a well-mixed slurry of approximately 35 wt % solids for less than a minute. Other techniques that can be used to immerse the monolith cells in slurry can include mild vacuum technique, pulling slurry up into the cells, and pumping the slurry into the monolith cells from above, inside a closed plastic vessel.

Excess slurry was removed from the cells using a high velocity nitrogen gas flow (approximately 200 L/min flow rate) for several minutes. The high flow gas purge resulted in rapid evaporative cooling of the slurry in the channels.

Plugging of the channels by dried slurry was observed. Without being bound by theory, it is believed that the evaporative cooling led to slower water evaporation and drying of the residual coating on the monolith wall. After discontinuing the gas purge, the monoliths statically air dried for hours (~3 to ~6 hours) in a vertical position.

Figure 7:
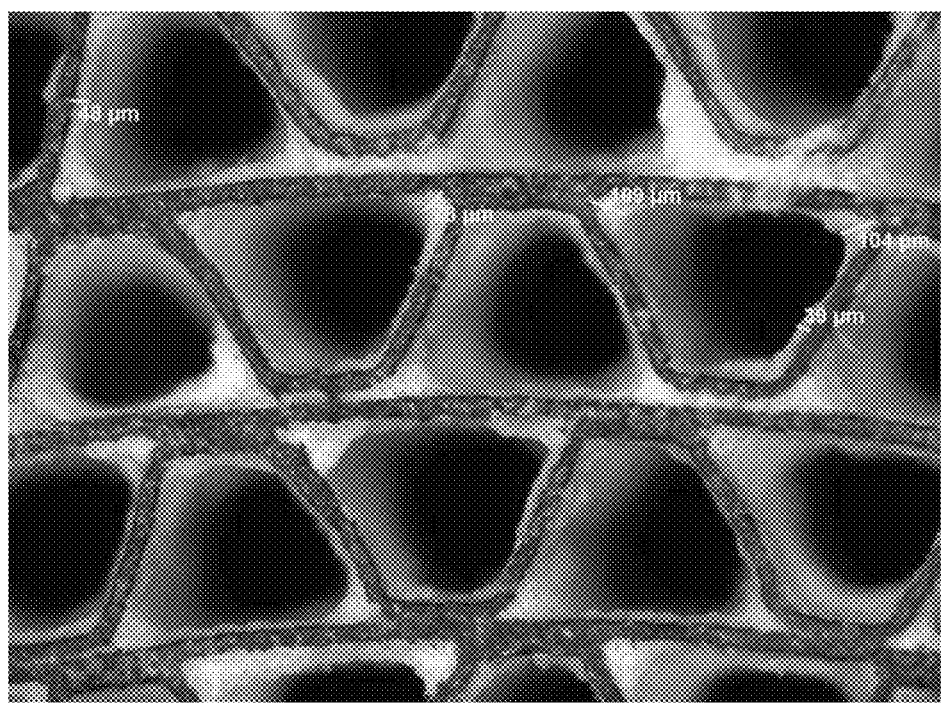
FIG. 7 illustrates a Leica Optical scope picture (40× magnification) of a 1440 cpsi metal monolith after 4 coatings with DDR (25-30 μm) and $SiO_2$ (100 nm).

After removal of excess slurry in the monolith channels, the monoliths were flash dried, to stabilize the films and prevent "bridging" and size segregation of the zeolite and binder particles on vertical standing. After the channels were initially cleared with a high flow gas purge, the gas stream was then heated with an in-line Osram heater to 50-60° C. to rapidly dry and stabilize films on the cell walls. The coating was dried in-situ for several minutes. The monoliths were then calcined in air to 500° C. using a heating ramp: a) 120° C. drying for 8 hrs, b) increase temperature to 500° C. over 4 hours, c) holding at 500° C. for 2 hours, and d) cooling to 120° C. in 2 hours. FIG. 7 shows a Leica Optical scope picture (40× magnification) of the 1440 cpsi metal monolith after 4 coatings with DDR (25-30 μm) and $SiO_2$ (100 nm), after removal of excess slurry and 500° C. calcination. FIG. 8 provides an SEM image of the DDR (25-30 μm) and $SiO_2$ (100 nm) coating on the 1440 cpsi metal monolith and/or a glass slide after 500° C. calcination.

Example 2—Integrity Testing of Coupons

Samples of test coupons were prepared and sent to Southwest Research Institute (SWRI), an independent lab, for coating integrity testing. The objective was to test the integrity of a washcoat coating on several test coupons under conditions of rapid pressurization and depressurization. During the testing, each coupon was individually installed into a test rig capable of rapid pressurization and depressurization. During the testing, a total of 24 pressure cycle tests were performed on six test coupons at five pressure conditions.

Sample Preparation

The substrate coupons used were polished 316 stainless steel (#8 finish), ~3.25" L×~0.5" W×~0.060" thick strips with 2 holes measuring ~0.12 inches in diameter drilled into each coupon for mounting to the test rig.

A ~69 wt % solids aqueous slurry was made by mixing ~1.4 grams of DDR zeolite (~10 μm to ~15 μm) prepared according to the methods described in U.S. Patent Application Publication No. 2014/0161717) and 1.526 grams of colloidal silica (~25 nm, 40 wt % solids, Aremco 644 S) to form a semi-paste. The paste, representative of the active components in a washcoating slurry, were applied to the coupons with a doctor-blade technique. The coated coupons were air dried at room temperature overnight. They were subsequently dried at ~120° C. for ~1 day.

Four sets (A-D) of duplicate samples were prepared by applying slurry above to coupons. Descriptions of the final coupons and labels are below:

NB 26027-25-2-2 samples: no pre-thermal oxidation treatment+Zr-silicate primer coating (Aremco 644-N material);

26-6-2 samples: ~900° C. oxidized coupon+Zr-silicate primer coating (Aremco 644-N material);

26-7-3 samples: ~900° C. oxidized coupon+no Zr primer coat+DDR/$SiO_2$ (~25 nm) having a ration of 70:30 w/w.

26-8-23 samples: ~900° C. oxidized coupon+Zr-silicate primer coating+DDR/$SiO_2$ (~25 nm) having a ratio of ~70:30 w/w;

25-4-23 samples: no pre-thermal oxidation treatment+Zr-silicate primer coating+DDR/$SiO_2$ (~25 nm) having a ratio of ~70:30 w/w.

Figure 9:
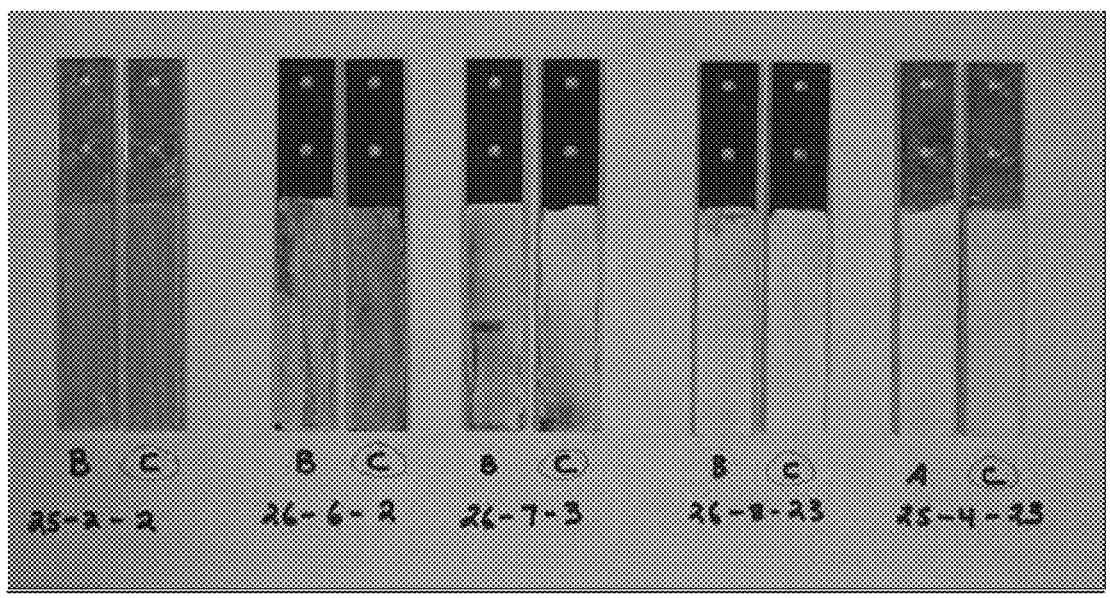
FIG. 9 provides photographs of the 25-2-2, 26-6-2, 26-7-3, 26-8-23 and 25-4-23 coupons with coating prior to integrity testing.

A picture of the samples as prepared is shown in FIG. 9. The circled letter indicates which samples were tested.

Test Procedure (SwRI)

The following test procedure was performed on the coupons:

1. The initial weight of the each coupon was recorded.
2. The coupons were loaded into the test rig and the following conditions were tested on each coupon in Table 1:

TABLE 1

Test Summary

| TEST CONDITION | NUMBER OF CYCLES PER COUPON | HIGH PRESSURE (psia) | LOW PRESSURE (psia) |
|---|---|---|---|
| Base 1 | 250 | 783 | 653 |
| Base 2 | 250 | 783 | 435 |
| Base 3 | 250 | 783 | 218 |
| Stepout 1 | 250 | 943 | 218 |
| Stepout 2 | 20 | 1230 | 218 |

3. After each test condition was complete, each coupon was removed from the rig and allowed to sit for at least 5 minutes to allow equilibration with room humidity. The mass of the coupons were taken by leaving the coupons on the scale for about 30 seconds to determine if the coupon was gaining mass through water absorption. Once mass gain had ceased, the mass for the coupons was recorded.

There was no significant weight loss for any of the coupons during the course of testing as shown in Tables 2 and 3 below.

TABLE 2

Weight after Testing

| TEST COUPON | RECORDED WEIGHT (g) | | | | | |
|---|---|---|---|---|---|---|
| | INITIAL WEIGHT | AFTER BASE 1 | AFTER BASE 2 | AFTER BASE 3 | AFTER STEPOUT 1 | AFTER STEPOUT 2 |
| 26-8-23C | 12.0983 | 12.0983 | 12.0985 | 12.0995 | 12.0990 | 12.0992 |
| 25-4-23C | 11.9207 | 11.9210 | 11.9211 | 11.9225 | — | — |
| 26-7-3C | 12.1812 | 12.1812 | 12.1816 | 12.1827 | — | — |

TABLE 3

| | | | Change in Test Coupon Weight | | | | |
|---|---|---|---|---|---|---|---|
| | INITIAL | INITIAL | WEIGHT CHANGE FROM INITIAL (g) | | | | |
| TEST COUPON | WEIGHT (g) | WEIGHT RANGE (g) | AFTER BASE 1 | AFTER BASE 2 | AFTER BASE 3 | AFTER STEPOUT 1 | AFTER STEPOUT 2 |
| 26-8-23C | 12.0983 | 0.0010 | 0.0000 | 0.0002 | 0.0012 | 0.0007 | 0.0008 |
| 25-4-23C | 11.9207 | 0.0010 | 0.0003 | 0.0004 | 0.0018 | — | — |
| 26-7-3C | 12.1812 | 0.0009 | 0.0000 | 0.0004 | 0.0015 | — | — |

Variation in coupon weight was observed, but these variances were on the same order of magnitude as those observed during the initial four weights obtained on each untested coupon.

Figure 10:
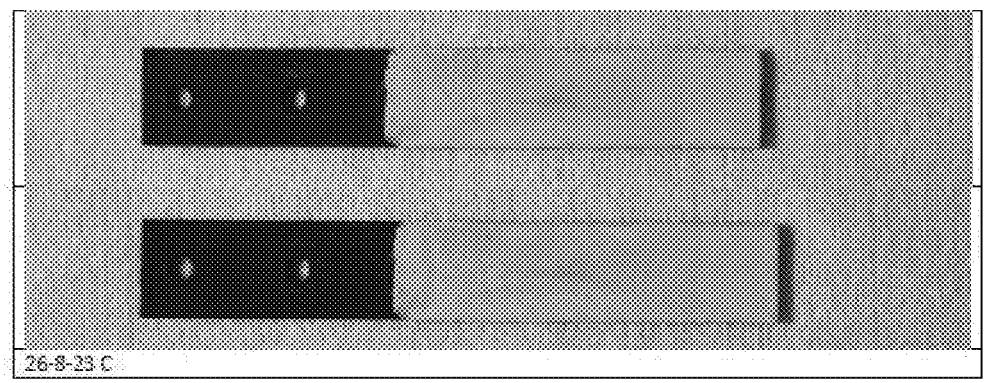
FIG. 10 illustrates a 26-8-23C coupon before integrity testing (top photograph) and after integrity testing (bottom photograph).
Figure 11:
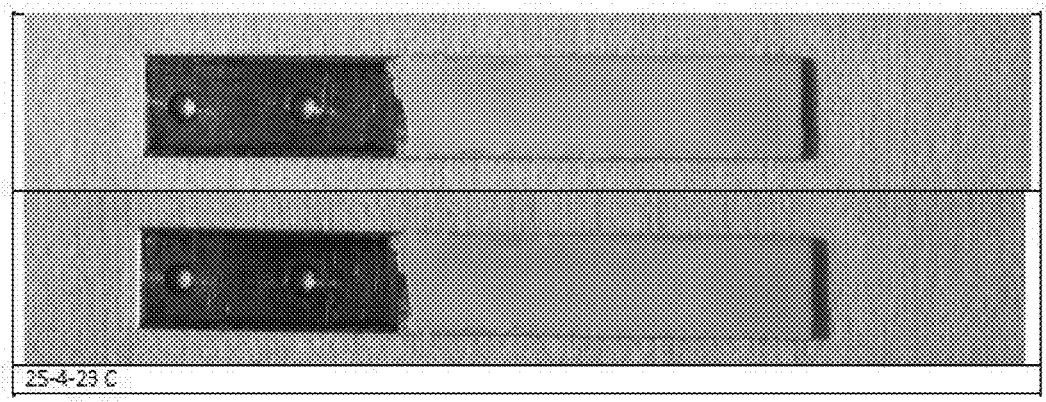
FIG. 11 illustrates a 25-4-23C coupon before integrity testing (top photograph) and after integrity testing (bottom photograph).
Figure 12:
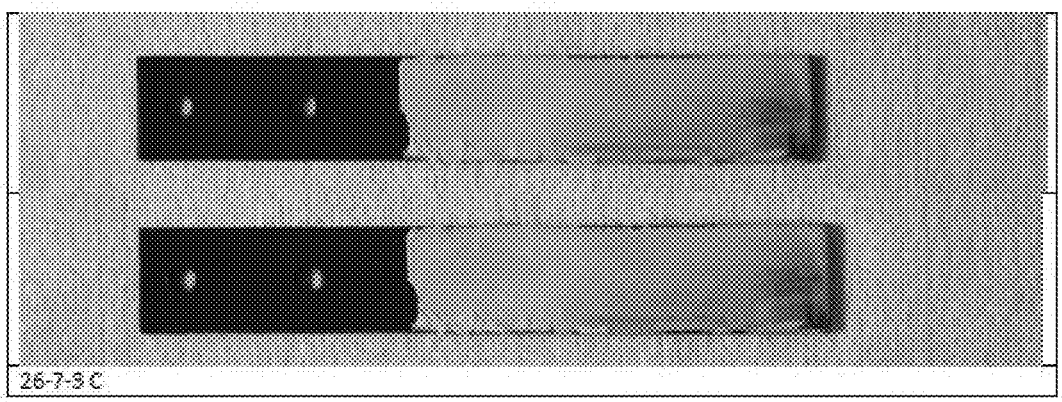
FIG. 12 illustrates a 26-7-3C coupon before integrity testing (top photograph) and after integrity testing (bottom photograph).

No visual indications of coating damage or loss were seen during the course of these experiments, as can be seen FIGS. 10-12, which provides comparison photographs of the coupons take before (top photograph) and after testing (bottom photograph).

Example 3—Integrity Testing of Coatings on Coated Monoliths

A ~2390 cpsi 316 stainless steel monolith (1.1" d×3" L) was oxidized at ~900° C. for ~6 hr, primed with a Zr-silicate coating and dip coated multiple times in a slurry of DDR (~25 μm) prepared according to the methods described in U.S. Patent Application Publication No. 2014/0161717 (25 nm Aremco 644-S colloidal $SiO_2$). After 500° C. calcination, the adsorbent coating matrix, was 20% by total weight and the resultant coated monolith was mounted on metal disc resulting in test button D.

Figure 13:
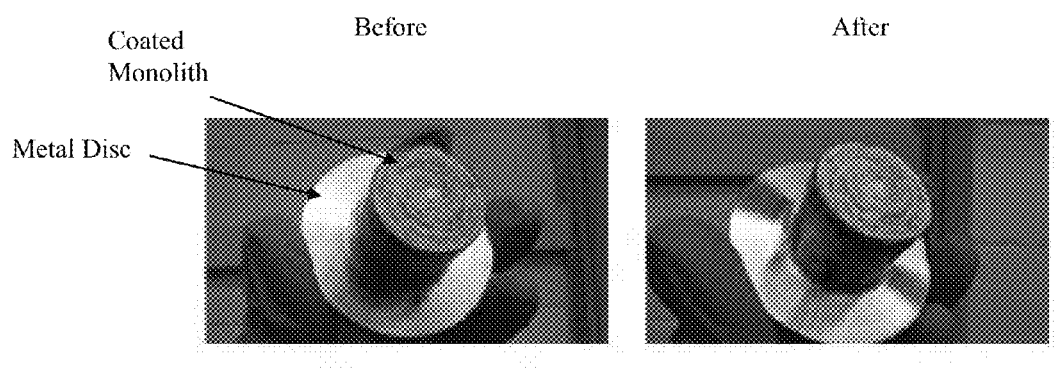
FIG. 13 illustrates test button D before (left photograph) and after (right photograph) adsorptive kinetic separation (AKS) integrity testing.
Figure 14:
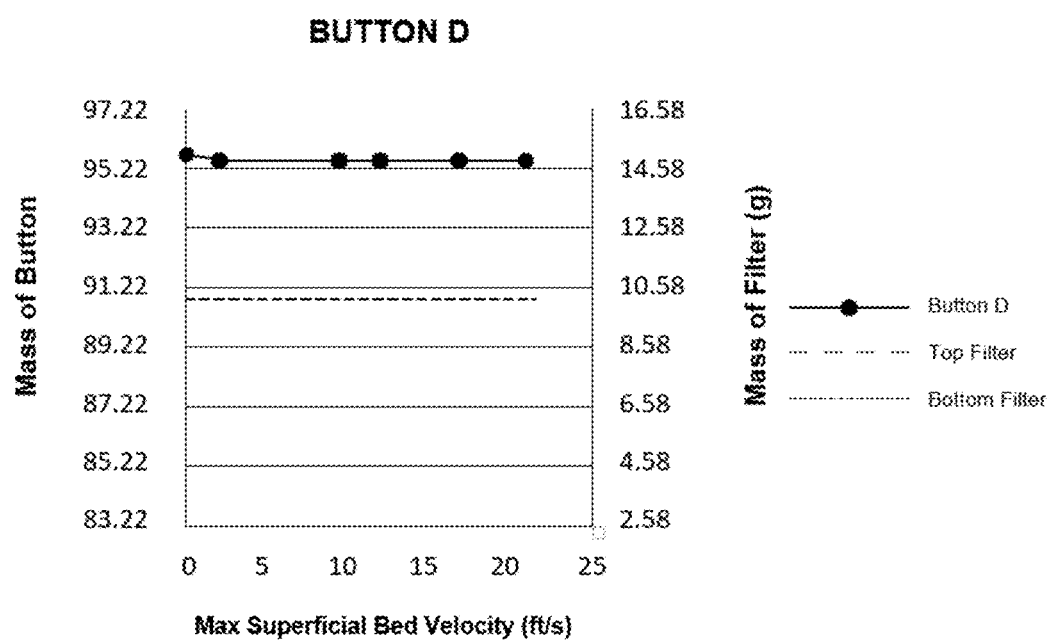
FIG. 14 illustrates weight of test button D as superficial gas velocity increases during AKS integrity test.

Pressure swing cycles were conducted on the washcoated monolith using the Test Rig for adsorptive kinetic separation (TRAKS). These tests were done at a adsorptive kinetic separation (AKS) pilot plant with gas velocities up to ~20 ft/s and pressure drops up to ~15 bar-a. As shown in FIG. 13 (pictures of test button D before and after testing) and FIG. 14 (weight of test button D as superficial gas velocity increases), no significant amount of wash-coat was lost during testing. The results indicate that the washcoat matrix on the monolith is robust enough to withstand AKS operating conditions.

Example 4—Activity Testing of Coatings

Samples of the washcoating matrix were processed for activity testing. Aqueous slurries were prepared with ~50 weight % solids content, as described in Example 1 above. The slurries were caste onto glass plates (~12"×~12") and air dried overnight (~8 to ~16 hours) to form a white colored film on the glass. The sample was then dried at ~120° C. for ~8 hours. The samples were removed from the glass plates and the shards of samples were calcined to ~500° C. for ~4 hours. A portion of the samples were then ground to a powder and sieved to ~75-~150 μm for activity testing by Zero Length Chromotography (ZLC) substantially according to the method described in U.S. patent application Ser. No. 14/573,177.

The samples tested are summarized below in Table 4.

TABLE 4

| | Samples for Activity Testing | | |
|---|---|---|---|
| 1 13-66 | DDR (25 um avg) 13-49 *25 nm Aremco SiO2 +0.5% Na-Silicate +no viscosifier | prep | |
| 2 13-66 | DDR (25 um avg) 13-49 *25 nm Aremco SiO2 +0.0% Na-Silicate +no viscosifier | 5 prep | |
| 3 13-66 | DDR (25 um avg) 13-49 *100 nm nm SiO2 +0.5% Na-Silicate +viscosifier | prep | |
| 4 13-66 | DDR (25 um avg) 13-49 *string of pearls SiO2 +0.5% Na-Silicate +viscosifier | prep | |
| 5 13-69 | DDR (25 um avg) 13-49 *25 nm Aremco SiO2 +0.0% Na-Silicate +no viscosifier | 0 prep | |
| 6 13-69 | DDR (25 um avg) 13-49 *100 nm nm SiO2 +0.5% Na-Silicate +viscosifier | 0 prep | |
| 7 13-69 | DDR (25 um avg) 13-49 *string of pearls SiO2 +0.5% Na-Silicate +viscosifier | prep | |

ZLC Measurement

Figure 15:
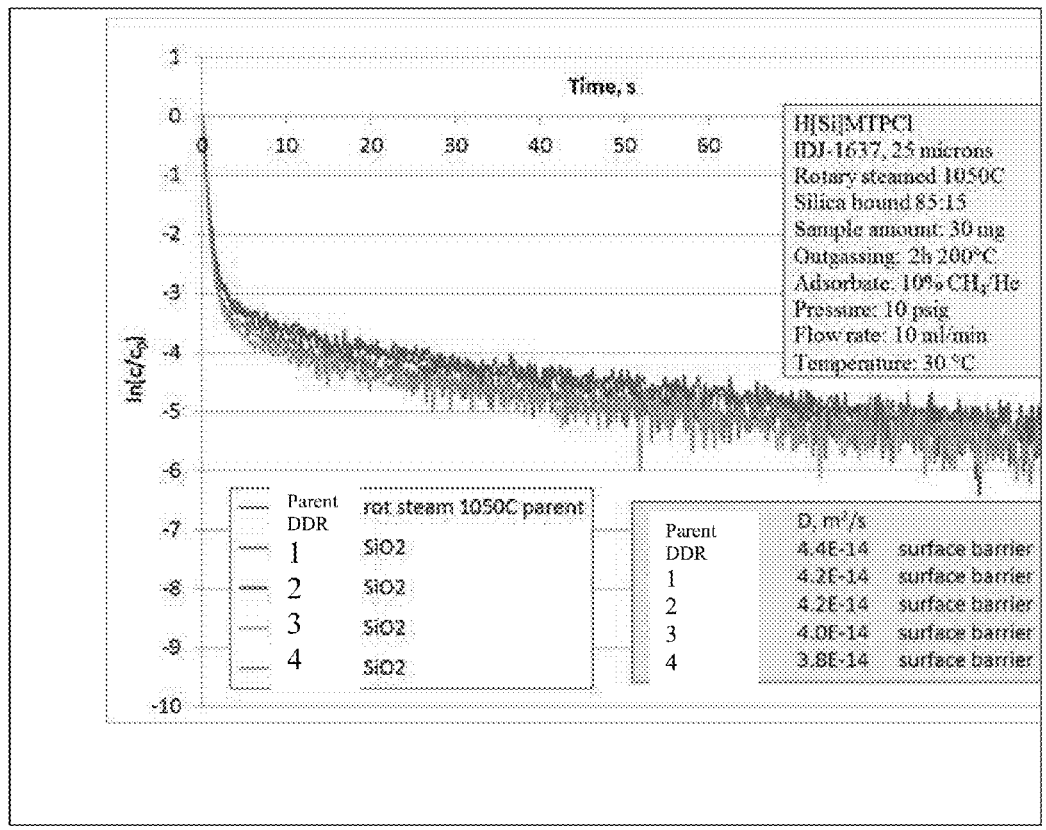
FIG. 15 illustrates zero length chromatography (ZLC) results comparing a DDR adsorbent (without binder) to $SiO_2$ bound DDR samples with a DDR:$SiO_2$ weight ratio of 85:15 w/w.
Figure 16:
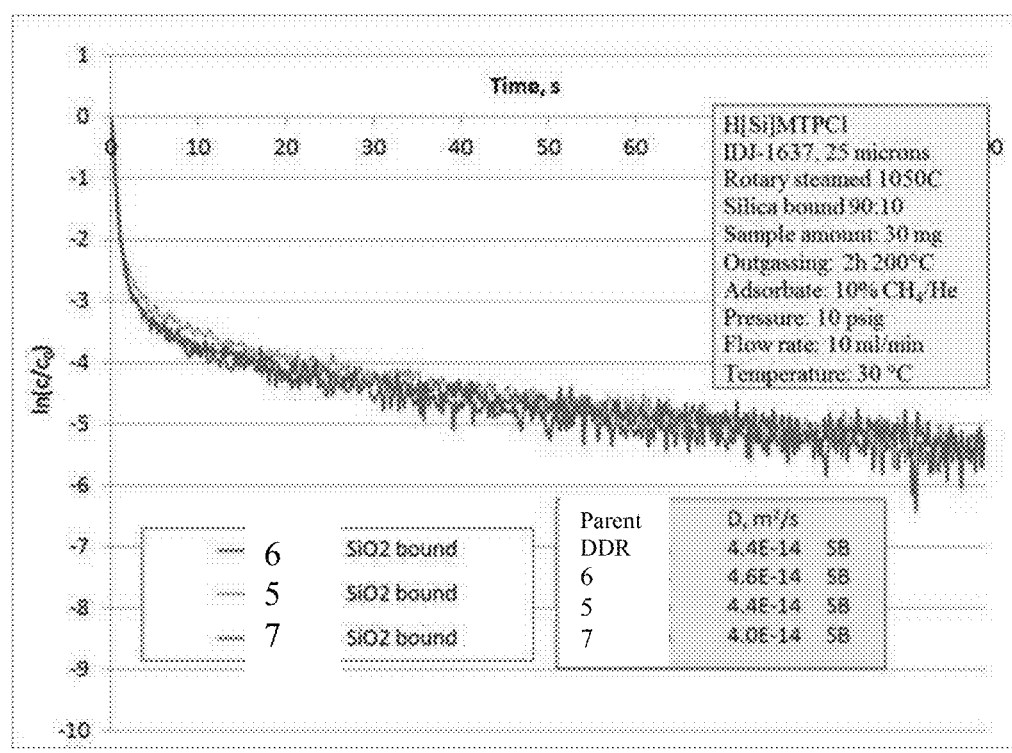
FIG. 16 illustrates ZLC results comparing a DDR adsorbent (without binder) to $SiO_2$ bound DDR samples with a DDR:$SiO_2$ weight ratio of 90:10 w/w.

Samples were tested by ZLC to determine if the additives in the coating matrix (e.g., $SiO_2$ binders and other additives) affected the kinetics of the adsorbent. As shown in FIGS. 15 and 16, there was minimal effect on methane diffusivity due to the diameter or amount of silica binder in the coating matrix samples compared to a DDR adsorbent ("parent DDR") which was steamed at 1050° C. As determined from FIGS. 15 and 16, the parent DDR had a diffusivity of 4.4 E-14 m2/s and the coating matrix samples with DDR bound with $SiO_2$ had a diffusivity of 4.0-4.6 E-14 m2/s.

Samples made with "string of pearls" (i.e., 4 and 7) exhibit a slightly lower methane diffusivity, suggesting a slight selectivation effect by this type of binder.

What is claimed is:

1. A structured adsorbent bed for purification of a gas feedstream comprising:
    a substrate having a cell density greater than 1040 cells per square inch (cpsi), wherein the substrate is a non-porous solid selected from a metal;
    a metal oxide layer that has been formed on the surface of the substrate by heating the substrate to a temperature from about 900° C. to about 1050° C.;

a primer layer on the metal oxide layer, wherein the primer layer is a zirconium-containing layer; and a coating on the zirconium-containing layer, wherein the coating comprises adsorbent particles and a binder.

2. The structured adsorbent bed of claim 1, wherein the adsorbent particles have an average diameter of about 2 μm to about 40 μm.

3. The structured adsorbent bed of claim 1, wherein the adsorbent particles have an average diameter greater than about 20 μm.

4. The structured adsorbent bed of claim 1, wherein the adsorbent particles comprise a microporous material.

5. The structured adsorbent bed of claim 4, wherein the microporous material comprises a zeolite.

6. The structured adsorbent bed of claim 5, wherein the zeolite is DDR.

7. The structure adsorbent bed of claim 6, wherein the zeolite is selected from the group consisting of Sigma-1 and ZSM-58.

8. The structured adsorbent bed of claim 1, wherein the binder comprises particles having an average diameter of about 25 nm to about 200 nm.

9. The structured adsorbent bed of claim 1, wherein the binder comprises particles having an average diameter of about 100 nm to about 200 nm.

10. The structured adsorbent bed of claim 1, wherein the binder has a pH greater than 7.

11. The structured adsorbent bed of claim 1, wherein the binder comprises $SiO_2$.

12. The structured adsorbent bed of claim 1, wherein the substrate has a cell density of about 1500 cpsi to about 4000 cpsi.

13. The structured adsorbent bed of claim 1, wherein the substrate has a cell density of about 1400 cpsi or greater.

14. The structured adsorbent bed of claim 1, wherein the coating on the substrate has a thickness of about 30 μm to about 200 μm.

15. The structured adsorbent bed of claim 1, wherein the coating on the substrate has a thickness of at least 100 μm or greater.

16. The structured adsorbent bed of claim 1, wherein the coating comprises one or more layers of adsorbent particles and binder particles.

17. The structured adsorbent bed of claim 1, wherein the metal is stainless steel.

18. A method of preparing the structured adsorbent bed of claim 1, the method comprising:

pretreating the substrate wherein the substrate is a non-porous solid selected from a metal by heating the substrate to a temperature from about 900° C. to about 1050° C., thereby forming a metal oxide layer;

applying a primer layer onto the metal oxide layer, wherein the primer layer is a zirconium-containing layer;

preparing an aqueous slurry comprising the adsorbent particles and the binder; and applying the aqueous slurry to the zirconium-containing layer to form the coating on the zirconium-containing layer.

19. The method of claim 18, wherein the zirconium-containing layer comprises zirconium oxide, zirconium silicate or a combination thereof.

20. The method of claim 18, wherein the binder is $SiO_2$.

21. The method of claim 18, wherein the weight ratio of the adsorbent particles to the binder is from about 70:30 w/w to about 90:10 w/w.

22. The method of claim 18, further comprising:
removing excess coating from the coated substrate;
drying the coated substrate; and
heating the coated substrate.

23. The method of claim 22, wherein the excess coating is removed from the substrate by flowing a gas through the coated substrate at a rate equal to or greater than 100 L/min.

24. The method of claim 22, wherein drying the coated substrate comprises flash drying the coated substrate wherein a gas purge heated from about 50° C. to about 60° C. is flowed through the coated substrate at rate of at least about 100 L/min.

25. The method of claim 18, wherein the coating has about 10% to about 40% macroporosity.

26. A gas separation process comprising contacting a gas mixture containing at least one contaminant with the structured adsorbent bed of claim 1.

27. The process of claim 26, wherein the gas mixture comprises $CH_4$.

28. The process of claim 26, wherein the at least one contaminant is selected from the group consisting $CO_2$, $H_2O$, $H_2S$, $NO_x$ and $SO_x$.

29. The gas separation process of claim 26, wherein the process comprises PSA, TSA, PPSA, PTSA, RCPSA, RCTSA, RCPPSA or RCPTSA.

* * * * *